(12) United States Patent
Wu

(10) Patent No.: US 12,113,925 B2
(45) Date of Patent: Oct. 8, 2024

(54) UNREAD MESSAGE MANAGEMENT METHOD AND TERMINAL DEVICE

(71) Applicant: VIVO MOBILE COMMUNICATION CO.,LTD., Guangdong (CN)

(72) Inventor: Guangchao Wu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 159 days.

(21) Appl. No.: 17/515,028

(22) Filed: Oct. 29, 2021

(65) Prior Publication Data
US 2022/0053083 A1  Feb. 17, 2022

Related U.S. Application Data

(63) Continuation of application No. PCT/CN2020/081247, filed on Mar. 25, 2020.

(30) Foreign Application Priority Data

Apr. 30, 2019  (CN) .......................... 201910364526.0

(51) Int. Cl.
*H04M 1/72472* (2021.01)
*H04M 1/7243* (2021.01)

(52) U.S. Cl.
CPC ..... *H04M 1/72472* (2021.01); *H04M 1/7243* (2021.01)

(58) Field of Classification Search
CPC ........... H04M 1/72436; H04M 1/7243; H04M 1/72439; G06F 3/0482; G06F 3/0481; G06Q 10/107
See application file for complete search history.

(56) References Cited

U.S. PATENT DOCUMENTS

| | | | |
|---|---|---|---|
| 9,361,017 B2 | 6/2016 | Huang | |
| 2010/0211889 A1* | 8/2010 | Durazo | ................ G06Q 10/107 |
| | | | 715/752 |
| 2011/0119616 A1 | 5/2011 | Suzuki | |
| 2014/0075375 A1* | 3/2014 | Hwang | ................. G06F 3/0485 |
| | | | 715/784 |
| 2014/0256295 A1* | 9/2014 | Peng | ..................... G06F 3/0481 |
| | | | 455/412.2 |

(Continued)

FOREIGN PATENT DOCUMENTS

| | | |
|---|---|---|
| CN | 101895630 A | 11/2010 |
| CN | 102130999 A | 7/2011 |

(Continued)

OTHER PUBLICATIONS

International Search Report of International Application No. PCT/CN2020/081247 mailed on Jul. 2, 2020.

(Continued)

*Primary Examiner* — Justin S Lee
(74) *Attorney, Agent, or Firm* — IP & T GROUP LLP

(57) ABSTRACT

An unread message management method includes: receiving a first input performed by a user, where the first input is an input performed by the user for a target identifier in a first interface; and displaying an unread message management window in response to the first input. The unread message management window includes a plurality of unread message groups, and each unread message group includes at least one unread message.

19 Claims, 15 Drawing Sheets

(56) References Cited

U.S. PATENT DOCUMENTS

| | | | |
|---|---|---|---|
| 2014/0344711 A1* | 11/2014 | Hallerstrom Sjostedt | ............... H04L 51/234 715/752 |
| 2015/0188870 A1* | 7/2015 | Sharp | ............... H04L 51/42 715/752 |
| 2016/0062700 A1 | 3/2016 | Liu et al. | |
| 2016/0147387 A1* | 5/2016 | Rahman | ............... G06F 40/258 715/752 |
| 2016/0182430 A1* | 6/2016 | Sachidanandam | ... G06Q 10/107 715/752 |
| 2016/0248853 A1* | 8/2016 | Chiu | ............... H04W 4/18 |
| 2016/0334956 A1* | 11/2016 | Tomino | ............... G06F 3/0488 |
| 2018/0331996 A1* | 11/2018 | Zhang | ............... H04L 51/04 |
| 2019/0149651 A1* | 5/2019 | Tokuchi | ............... H04M 1/72436 455/466 |
| 2019/0356770 A1* | 11/2019 | Yu | ............... G06F 3/0482 |
| 2020/0104728 A1* | 4/2020 | Lakshmanan | ............... G06Q 10/109 |
| 2020/0259946 A1* | 8/2020 | Mao | ............... G06F 3/04883 |
| 2020/0396191 A1* | 12/2020 | Yang | ............... H04L 51/42 |

FOREIGN PATENT DOCUMENTS

| | | | | |
|---|---|---|---|---|
| CN | 103220413 | A | 7/2013 | |
| CN | 103412716 | A | 11/2013 | |
| CN | 105979076 | A | 9/2016 | |
| CN | 105988679 | A | 10/2016 | |
| CN | 106325671 | A | 1/2017 | |
| CN | 108024019 | A | 5/2018 | |
| CN | 109388713 | A | 2/2019 | |
| IN | 110233931 | A | 9/2019 | |
| WO | WO-2019154153 | A1 * | 8/2019 | ....... G06F 16/90332 |

OTHER PUBLICATIONS

Written Opinion of The International Searching Authority of International Application No. PCT/CN2020/081247 mailed on Jul. 2, 2020.

First Office Action of Priority Application No. 201910364526.0 mailed on May 26, 2020.

Second Office Action of Priority Application No. 201910364526.0 mailed on Oct. 23, 2020.

* cited by examiner

UNREAD MESSAGE MANAGEMENT METHOD AND TERMINAL DEVICE

CROSS-REFERENCE OF RELATED APPLICATIONS

This application is a Bypass Continuation Application of PCT/CN2020/081247, filed on Mar. 25, 2020, which claims priority to Chinese Patent Application No. 201910364526.0, filed on Apr. 30, 2019, which are incorporated herein by reference in their entirety.

TECHNICAL FIELD

Embodiments of the present disclosure relate to the field of communications technologies, and in particular, to an unread message management method and a terminal device.

BACKGROUND

Generally, after receiving a message (hereinafter referred to as a message A) via an application, a terminal device may display the message A in an interface of the application according to a time sequence in which the terminal device receives messages via the application, and mark the message A as an unread message when the message A is not viewed by a user.

However, when there are a plurality of messages displayed in an interface of an application, because the plurality of messages are usually arranged in the interface according to a time sequence in which the terminal device receives the plurality of messages, if the user needs to search for an unread message that is received earlier in the application, the user needs to search the plurality of messages displayed in the interface one by one until the unread message required by the user is found. In this way, an operation of the user is relatively complex and time-consuming.

SUMMARY

The embodiments of the present disclosure provide an unread message management method and a terminal device.

A first aspect of the embodiments of the present disclosure provides an unread message management method, applied to a terminal device, where the unread message management method includes: receiving a first input performed by a user, where the first input is an input performed by the user for a target identifier in a first interface; and displaying an unread message management window in response to the first input, where the unread message management window includes a plurality of unread message groups, and each unread message group includes at least one unread message.

A second aspect of the embodiments of the present disclosure provides a terminal device, where the terminal device includes a receiving unit and a display unit; the receiving unit is configured to receive a first input performed by a user, where the first input is an input performed by the user for a target identifier in a first interface; and the display unit is configured to display an unread message management window in response to the first input received by the receiving unit, where the unread message management window includes a plurality of unread message groups, and each unread message group includes at least one unread message.

A third aspect of the embodiments of the present disclosure provides a terminal device, where the terminal device includes a processor, a memory, and a computer program that is stored in the memory and executable on the processor, and when the computer program is executed by the processor, the steps of the unread message management method in the first aspect are implemented.

A fourth aspect of the embodiments of the present disclosure provides a non-transitory computer-readable storage medium, where the non-transitory computer-readable storage medium stores a computer program, and when the computer program is executed by a processor, the steps of the unread message management method in the first aspect are implemented.

DETAILED DESCRIPTION OF EMBODIMENTS

Figure 1:
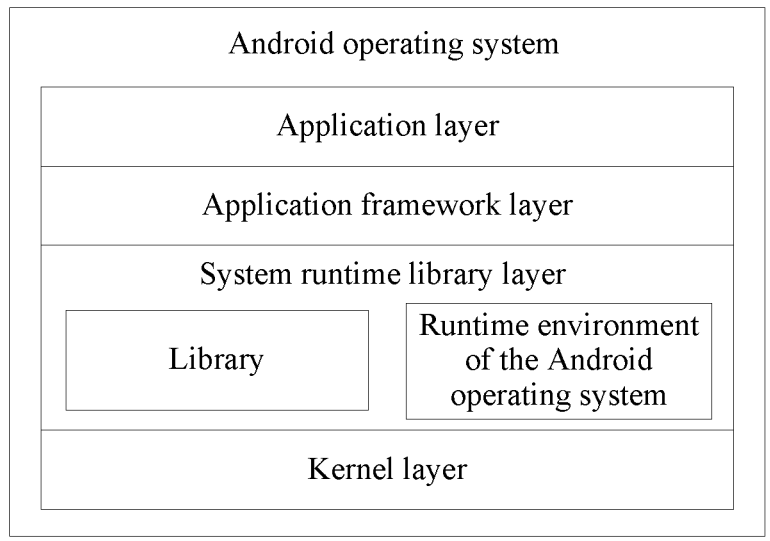
FIG. 1 is a schematic architectural diagram of an Android operating system according to an embodiment of the present disclosure.

The technical solutions in the embodiments of the present disclosure are described below clearly with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

In the specification and claims of the present disclosure, the terms such as "first" and "second" are used to distinguish between different objects, but are not used to describe a particular sequence of the objects. For example, a first input, a second input, and the like are intended to distinguish between different inputs, instead of describing a particular order of the inputs.

In the description of the embodiments of the present disclosure, unless otherwise specified, the meaning of "a plurality of" means two or more. For example, multiple elements refer to two elements or more than two elements.

The term "and/or" in this specification describes an association relationship of associated objects, indicating that three relationships may exist. For example, a display panel and/or a backlight may indicate three cases: only the display panel exists, both the display panel and the backlight exist, and only the backlight exists. A character "/" in this specification indicates an "or" relationship between associated objects. For example, input/output indicates input or output.

In the embodiments of the present disclosure, the word such as "example" or "for example" is used to represent giving an example, an illustration, or a description. Any embodiment or design scheme described as "exemplary" or "for example" in the embodiments of the present disclosure should not be construed as being more preferred or advantageous than other embodiments or design schemes. To be precise, the use of the term such as "exemplary" or "for example" is intended to present a related concept in a specific manner.

The embodiments of the present disclosure provide an unread message management method and a terminal device. After receiving a first input performed by a user (the first input is an input performed by the user for a target identifier in a first interface), the terminal device may display an unread message management window (the unread message management window includes a plurality of unread message groups, and each unread message group includes at least one unread message). The user may directly perform the first input for the target identifier, to enable the terminal device to display the unread message management window, so that the user can find a required unread message from a plurality of unread messages in the unread message management window, without a need to search a plurality of labels (the plurality of labels include a label corresponding to an unread message and a label corresponding to a read message) in an interface of a first application one by one. In this way, an operation of the user can be simplified, time consumed in a search process can be reduced, and human-computer interaction performance can be improved.

The unread message management method and the terminal device that are provided in the embodiments of the present disclosure can be applied to a process in which the terminal device manages unread messages in an application. Optionally, the unread message management method and the terminal device can be applied to a process in which the terminal device manages unread messages in an application via an unread message management window.

The terminal device provided in the embodiments of the present disclosure may be a terminal device with an operating system. The operating system may be an Android operating system, or may be an iOS operating system or other possible operating systems, which is not specifically limited in the embodiments of the present disclosure.

The following uses the Android operating system as an example to introduce a software environment applicable to the unread message management method provided in the embodiments of the present disclosure.

FIG. 1 is a schematic architectural diagram of a possible Android operating system according to an embodiment of the present disclosure. In FIG. 1, the architecture of the Android operating system includes 4 layers, namely: an application layer, an application framework layer, a system runtime library layer, and a kernel layer (it may be the Linux kernel layer).

The application layer includes various applications in the Android operating system (including system applications and third-party applications).

The application framework layer is the framework of applications. Developers can develop some applications based on the application framework layer while complying with the development principle of the application framework.

The system runtime library layer includes a library (also called a system library) and a runtime environment of the Android operating system. The library mainly provides various resources needed by the Android operating system. The runtime environment of the Android operating system is used to provide a software environment for the Android operating system.

The kernel layer is the operating system layer of the Android operating system and belongs to the lowest layer of software hierarchy of the Android operating system. The kernel layer provides core system services and hardware-related drivers for the Android operating system based on the Linux kernel.

The Android operating system is used as an example. In the embodiments of the present disclosure, based on the system architecture of the Android operating system shown in FIG. 1, developers can develop software programs that implement the unread message management method provided in the embodiments of the present disclosure, so that the unread message management method can be performed based on the Android operating system shown in FIG. 1. That is, by running the software program in the Android operating system, the processor or the terminal device can implement the unread message management method provided in the embodiments of the present disclosure.

The terminal device in the embodiments of the present disclosure may be a mobile terminal device or a non-mobile terminal device. For example, the mobile terminal device may be a mobile phone, a tablet computer, a laptop computer, a palmtop computer, an in-vehicle terminal device, a wearable device, a ultra-mobile personal computer (UMPC), a netbook, or a personal digital assistant (PDA). The non-mobile terminal device may be a personal computer (PC), a television (TV), an automated teller machine or a self-service machine. This is not specifically limited in the embodiments of the present disclosure.

The following describes in detail the unread message management method and the terminal device provided in the embodiments of the present disclosure through some embodiments and application scenarios with reference to the accompanying drawings.

Currently, in the related art, when there are a plurality of messages displayed in an interface of an application, because the plurality of messages are usually arranged in the interface according to a time sequence in which the terminal device receives the plurality of messages, if the user needs to search for an unread message that is received earlier in the application, the user needs to search the plurality of messages displayed in the interface one by one until the unread message required by the user is found. In this way, an operation of the user is relatively complex and time-consuming.

Figure 2:
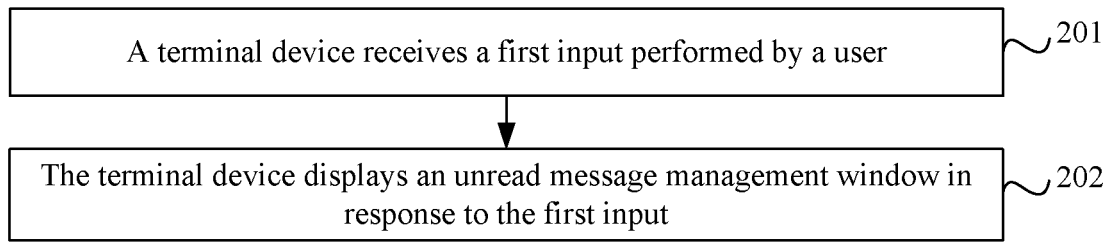
FIG. 2 is a first schematic diagram of an unread message management method according to an embodiment of the present disclosure.

To resolve the foregoing technical problem, the embodiments of the present disclosure provide the unread message management method. FIG. 2 is a flowchart of the unread message management method according to an embodiment of the present disclosure. The method can be applied to a terminal device with an Android operating system shown in FIG. 1. As shown in FIG. 2, the unread message management method provided in this embodiment of the present disclosure may include the following steps 201 and 202.

Step 201: The terminal device receives a first input performed by a user.

In this embodiment of the present disclosure, the first input is an input performed by the user for a target identifier in a first interface.

In this embodiment of the present disclosure, the target identifier is used to indicate an unread message management window, and the first interface is an interface of a first application.

In this embodiment of the present disclosure, the target identifier is displayed in the first interface, the user may perform the first input for the target identifier, to trigger the terminal device to display the unread message management window.

It may be understood that, in this embodiment of the present disclosure, the unread message management window may be used to manage unread messages.

Optionally, in this embodiment of the present disclosure, the unread message management window may be used to save an unread message (for example, a first message), delete an unread message, or change a state (for example, a read state) of an unread message.

It may be understood that, before the user performs an input in the unread message management window, all messages in the unread message management window are in an unread state.

Optionally, in this embodiment of the present disclosure, the first interface may be a message interface of the first application.

Optionally, in this embodiment of the present disclosure, the first input may be a tap operation (for example, a single-tap operation) performed by the user for the target identifier.

Step 202: The terminal device displays an unread message management window in response to the first input.

In this embodiment of the present disclosure, the unread message management window includes a plurality of unread message groups, and each unread message group includes at least one unread message.

Optionally, in this embodiment of the present disclosure, the unread message management window may further include information about a contact that sends each unread message.

Figure 3:
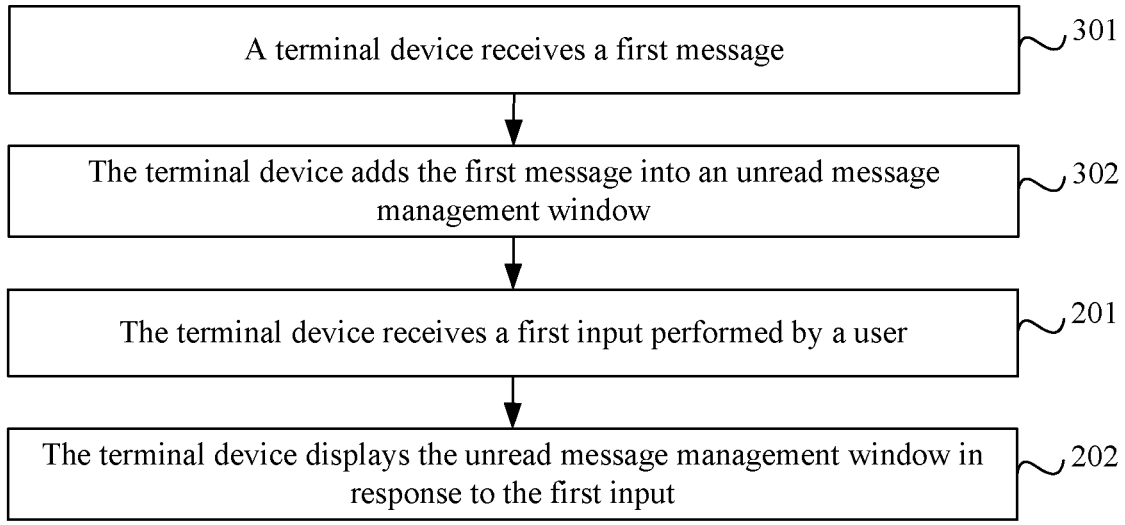
FIG. 3 is a second schematic diagram of the unread message management method according to an embodiment of the present disclosure.

Optionally, in this embodiment of the present disclosure, the first interface is a user interface of the first application, and the unread message management window is a window of the first application. With reference to FIG. 2, as shown in FIG. 3, before step 201, the unread message management method provided in this embodiment of the present disclosure may further include the following steps 301 and 302.

Step 301: The terminal device receives a first message.

In this embodiment of the present disclosure, the first message is a message received via the first application.

Optionally, in this embodiment of the present disclosure, the first message may be a notification message (for example, a push message) received via the first application.

Step 302: The terminal device adds the first message into an unread message management window.

In this embodiment of the present disclosure, the unread message management window is a window of the first application.

In this embodiment of the present disclosure, the terminal device may add the received first message into the unread message management window that is used to manage unread messages, so that when searching for a required unread message, the user can directly find the required unread message from a plurality of unread messages in the unread message management window, without a need to search a plurality of labels in an interface of the first application one by one. In this way, an operation of the user can be simplified, and time consumed in a search process can be reduced.

Optionally, in this embodiment of the present disclosure, the terminal device may display a label (for example, a second label) and the target identifier in the first interface.

In this embodiment of the present disclosure, the second label is used to indicate a first message interaction window, and the target identifier is used to indicate the unread message management window.

Optionally, in this embodiment of the present disclosure, when the terminal device currently displays the first interface, if the terminal device receives the first message, the terminal device may directly display the second label in the first interface.

Optionally, in this embodiment of the present disclosure, when the terminal device currently displays another interface (the another interface is an interface that is of the first application and that is different from the first interface), if the terminal device receives the first message, the terminal device may display the first interface after receiving an input performed by the user.

Optionally, in this embodiment of the present disclosure, when the terminal device currently displays another interface (the another interface may be a desktop, an interface of another application, a locked-screen and bright-screen interface, or the like), if the terminal device receives the first message, the terminal device may display the first interface after receiving an input (for example, a tap operation for a notification bar) performed by the user.

Optionally, in this embodiment of the present disclosure, the target identifier may be displayed in a target area (for example, the uppermost area) in the first interface.

It may be understood that, the target identifier may be an operation entry of the unread message management window. For example, the user may perform an input for the target identifier, to trigger the terminal device to display the unread message management window, and the user may perform an operation for an unread message in the unread message management window. The second label may be an operation entry of the first message interaction window. For example, the user may perform an input for the second label, to trigger the terminal device to display the first message interaction window, and the user may perform an operation for a message in the first message interaction window.

Optionally, in this embodiment of the present disclosure, the first interface includes at least one label (the at least one label (for example, N labels in the following embodiments) includes the second label), and the at least one label may include at least one unread message label (a message interaction window indicated by the unread message label includes an unread message), or the at least one label may include at least one unread message label and at least one read message label (all messages in a message interaction window indicated by the read message label are in a read state).

Optionally, in this embodiment of the present disclosure, each of the at least one unread message label may include an identifier (the identifier is used to indicate that there is an unread message in a message interaction window that is indicated by the unread message label).

Optionally, in this embodiment of the present disclosure, an identifier included by each unread message label may be a digital identifier.

Optionally, in this embodiment of the present disclosure, each of the at least one label includes information about a contact, a keyword of a message, and the like. For example, the second label includes information about a first contact (for example, a name, an image identifier, and the like of the first contact).

Figure 4A:
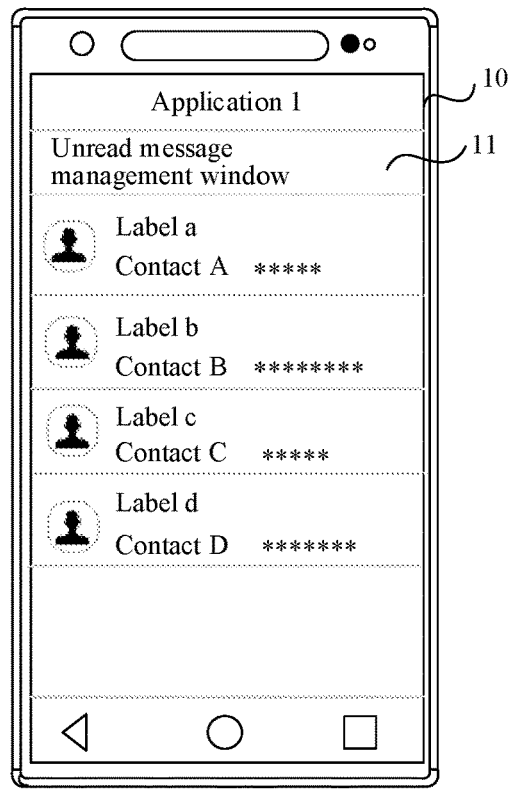
FIG. 4A is a first schematic diagram of an example of an interface of a mobile phone according to an embodiment of the present disclosure.
Figure 4B:
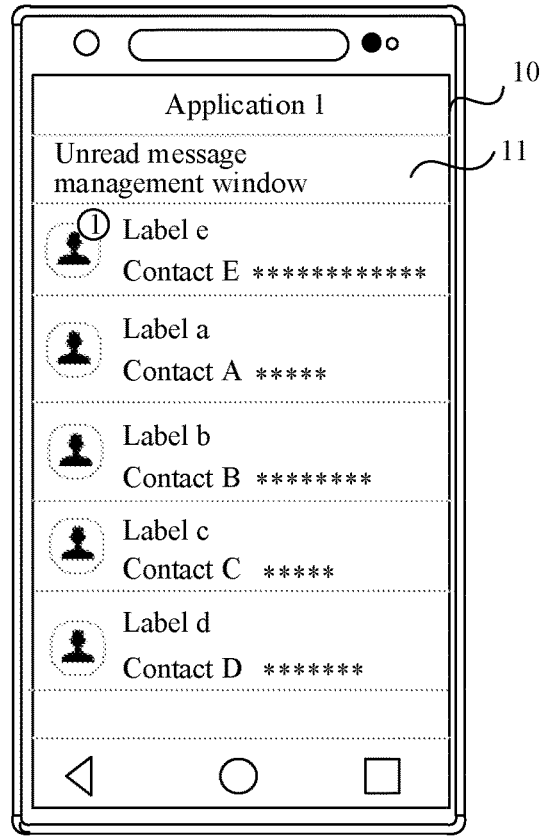
FIG. 4B is a second schematic diagram of an example of an interface of a mobile phone according to an embodiment of the present disclosure.

For example, the following uses an example in which the terminal device is a mobile phone for description. As shown in FIG. 4A, a first interface 10 (for example, an interface of an application 1) of the mobile phone includes at least one label (for example, labels a to d, and each label includes information about a contact (for example, a name and an image identifier of the contact)) and a target identifier 11. After receiving a first message, as shown in FIG. 4B, the mobile phone may display a second label (for example, a label e) in the first interface, add the first message into a message interaction window indicated by the label e (in FIG. 4B, that the label e includes a digital identifier and information about a first contact (for example, a contact E) (for example, a name and an image identifier of the first contact) is used as an example for description), and add the first message into an unread message management window indicated by the target identifier 11.

According to the unread message management method provided in this embodiment of the present disclosure, after receiving the first input performed by the user (the first input is an input performed by the user for the target identifier in the first interface), the terminal device may display the unread message management window (the unread message management window includes a plurality of unread message groups, and each unread message group includes at least one unread message). The user may directly perform the first input for the target identifier, to enable the terminal device to display the unread message management window, so that the user can find a required unread message from a plurality of unread messages in the unread message management window, without a need to search a plurality of labels (the plurality of labels include a label corresponding to an unread message and a label corresponding to a read message) in an interface of the first application one by one. In this way, an operation of the user can be simplified, time consumed in a search process can be reduced, and human-computer interaction performance can be improved.

Figure 5:
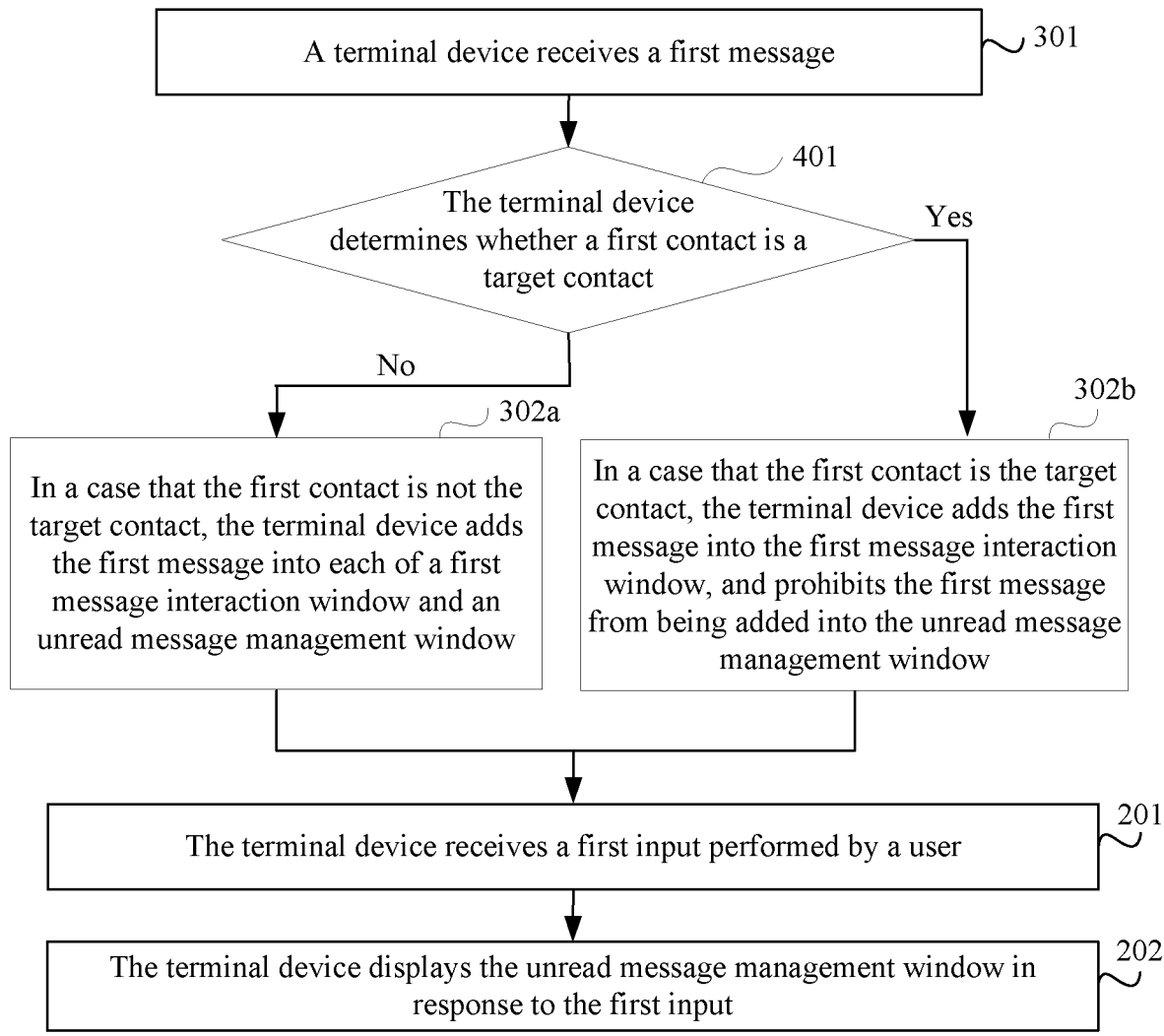
FIG. 5 is a third schematic diagram of the unread message management method according to an embodiment of the present disclosure.

Optionally, in this embodiment of the present disclosure, with reference to FIG. 3, as shown in FIG. 5, before step 302, the unread message management method provided in this embodiment of the present disclosure may further include the following step 401, and step 302 may be implemented by the following step 302a or 302b.

Step 401: The terminal device determines whether a first contact is a target contact.

In this embodiment of the present disclosure, the first contact is a contact that sends the first message, and a message sent by the target contact is prohibited from being added into the unread message management window.

Optionally, in this embodiment of the present disclosure, the terminal device may determine whether information about the first contact matches target information, to determine whether the first contact is the target contact. The target information is information about the target contact.

Optionally, in this embodiment of the present disclosure, the target information is information that is about the target contact and that is stored in the terminal device. The target information may be information that is about the target contact and that is entered by the user, or information that is about the target contact and that is defaulted by a system of the terminal device.

Optionally, in this embodiment of the present disclosure, the user may perform an input (for example, a touch and hold input) for a label in the first interface, to trigger the terminal device to display a permission setting interface of a contact that corresponds to the label, and the user may perform another input, to trigger the terminal device to set a permission of the contact as: a message sent by the contact is prohibited from being added into the unread message management window.

Figure 6:
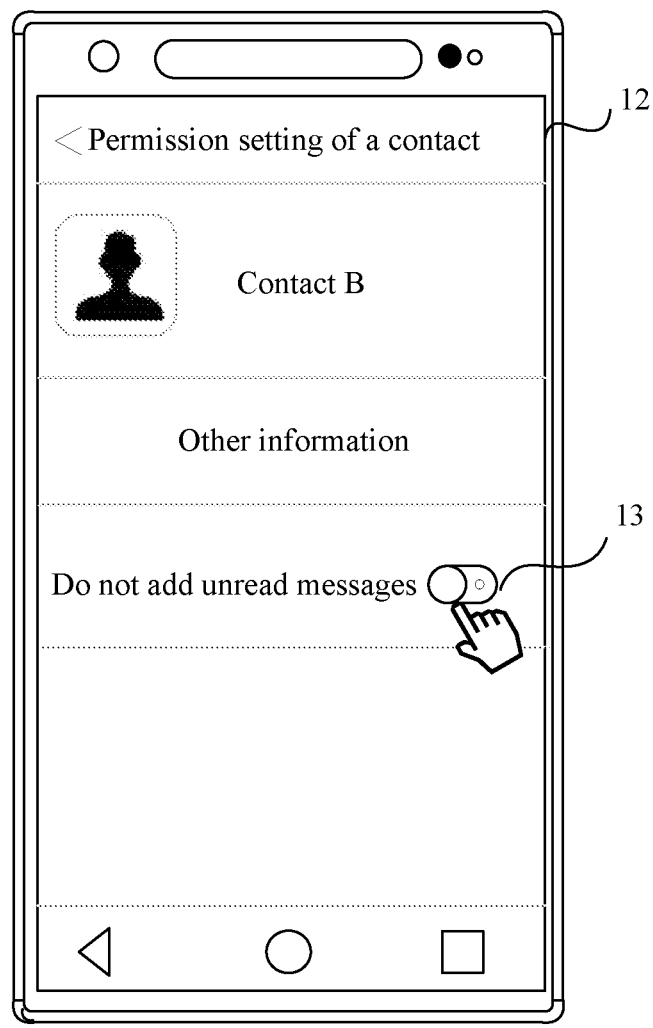
FIG. 6 is a third schematic diagram of an example of an interface of the mobile phone according to an embodiment of the present disclosure.

For example, with reference to FIG. 4A, after the user performs an input (for example, a touch and hold input) for a label b, as shown in FIG. 6, the mobile phone displays a permission setting interface of a contact (for example, an interface 12). The interface 12 includes information about a contact B (the contact B is a contact that sends a message in a message interaction window indicated by the label b) (for example, a name, an image identifier, and the like of the contact B), a control 13 (the control 13 is used for the user to set a permission of the contact B), and the like. The user may perform an input for the control 13, to enable the mobile phone to set the permission of the contact B as: a message sent by the contact B is prohibited from being added into the unread message management window.

Optionally, in this embodiment of the present disclosure, the terminal device may set a permission of a contact whose quantity of interactions is greater than a preset number as: a message sent by the contact is prohibited from being added into the unread message management window.

Optionally, in this embodiment of the present disclosure, the terminal device may set a permission of a contact with a specific label (a label such as family or friend) as: a message sent by the contact is prohibited from being added into the unread message management window.

It should be noted that, in this embodiment of the present disclosure, "match" may be understood as: a similarity between compared objects is greater than or equal to a first preset threshold, or a difference between the compared objects is less than or equal to a second preset threshold. For example, "information about the first contact matches target information" may be understood as: a difference between the information about the first contact and the target information is less than or equal to a second preset threshold.

Step 302*a*: In a case that the first contact is not the target contact, the terminal device adds the first message into each of a first message interaction window and an unread message management window.

In this embodiment of the present disclosure, the first message interaction window is a window that is of the first application and that is used for the user to perform message interaction with the first contact.

Optionally, in this embodiment of the present disclosure, in a case that the information about the first contact does not match the target information, the terminal device adds the first message into each of the first message interaction window and the unread message management window.

It may be understood that, "information about the first contact does not match target information" may be understood as: no permission of any contact is set in the first application as: a message sent by the contact is prohibited from being added into the unread message management window. In this way, all unread messages received by the terminal device via the first application may be added into the unread message management window.

It should be noted that, for a method of adding, by the terminal device, the first message into each of the first message interaction window and the unread message management window, refer to the description of the foregoing embodiment, and details are not described herein again.

Step 302*b*: In a case that the first contact is the target contact, the terminal device adds the first message into the first message interaction window, and prohibits the first message from being added into the unread message management window.

Optionally, in this embodiment of the present disclosure, in a case that the information about the first contact matches the target information, the terminal device adds the first message into the first message interaction window, and prohibits the first message from being added into the unread message management window.

It may be understood that, "information about the first contact matches target information" may be understood as: a permission of the first contact is that a message sent by the first contact is prohibited from being added into the unread message management window. In this way, the terminal device may add the first message into only the first message interaction window, and does not add the first message into the unread message management window.

In this embodiment of the present disclosure, the terminal device can determine, based on whether the information about the first contact matches the target information, a method of adding the first message (that is, whether to add the first message into each of the first message interaction window and the unread message management window, or whether to add the first message into only the first message interaction window), which can improve flexibility of the terminal device for managing received unread messages.

Optionally, in this embodiment of the present disclosure, a message interaction window indicated by N labels in the first interface includes M unread messages, and the unread message management window may include the M unread messages (the M unread messages include the first message).

It should be noted that, the N labels may be understood as N unread labels.

Optionally, in this embodiment of the present disclosure, the unread message management window includes at least one display area, each display area displays at least one unread message in an unread message group, and all unread messages in each display area are sent by a same contact.

Optionally, in this embodiment of the present disclosure, the terminal device may display unread messages in a plurality of display areas in a plurality of different colors, that is, unread messages in each display area correspond to one color.

Figure 7:
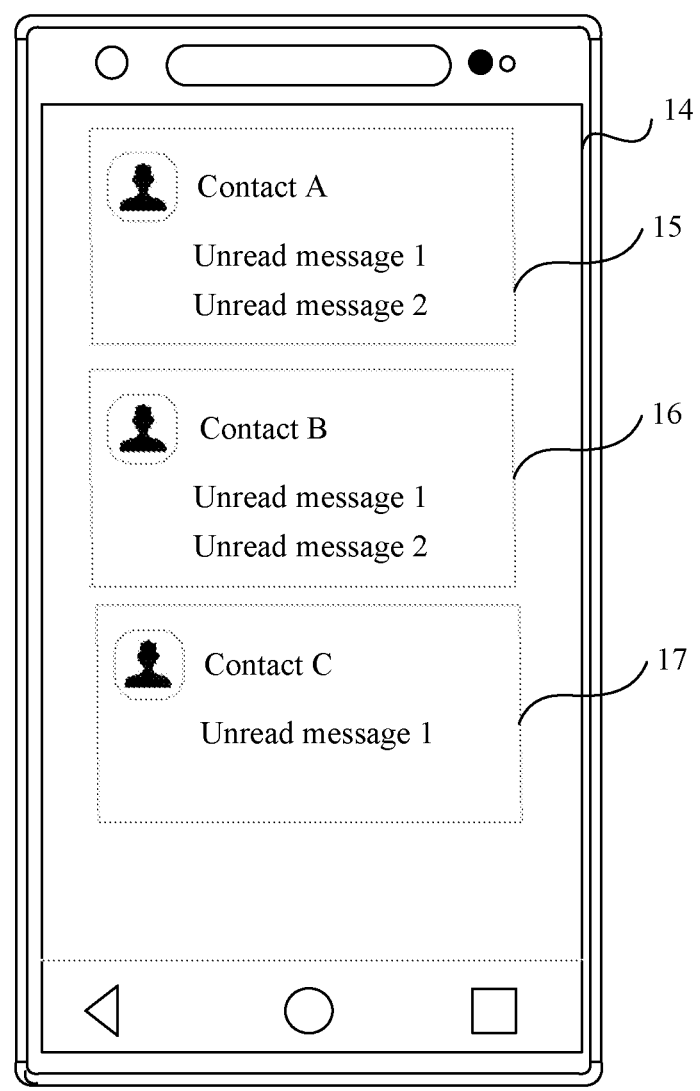
FIG. 7 is a fourth schematic diagram of an example of an interface of the mobile phone according to an embodiment of the present disclosure.

For example, after the user performs the first input for the target identifier, as shown in FIG. 7. the mobile phone displays an unread message management window 14. The unread message management window 14 includes M unread messages (in FIG. 7, that five unread messages (for example, unread messages 1 and 2 from a contact A, unread messages 1 and 2 from a contact B, and an unread message 1 from a contact C) are displayed is used as an example for description), the unread messages 1 and 2 from the contact A are displayed in an area 15, the unread messages 1 and 2 from the contact B are displayed in an area 16, and the unread message 1 from the contact C is displayed in an area 17.

Optionally, in this embodiment of the present disclosure, the unread message management window includes at least one display area, each display area displays at least one unread message in an unread message group, all unread messages in each display area have a same characteristic, and a characteristic of each message is determined based on at least one of the following: a keyword of the message, semantic information of the message, or format information of the message.

It may be understood that the format information of the message may be used to indicate a format (for example, a picture format, a voice format, a text format, or an emoji package format) of the message.

Optionally, in this embodiment of the present disclosure, the terminal device may obtain a keyword, semantic information, or format information of a message, combine messages with a same keyword, a same (or similar) semantic meaning, or a same format, and then display a combined message in one display area.

Optionally, in this embodiment of the present disclosure, the terminal device may combine messages with a same keyword (or with a same or similar semantic meaning, or with a same format) that are sent by a same contact, and then display a combined message in one display area.

Figure 8A:
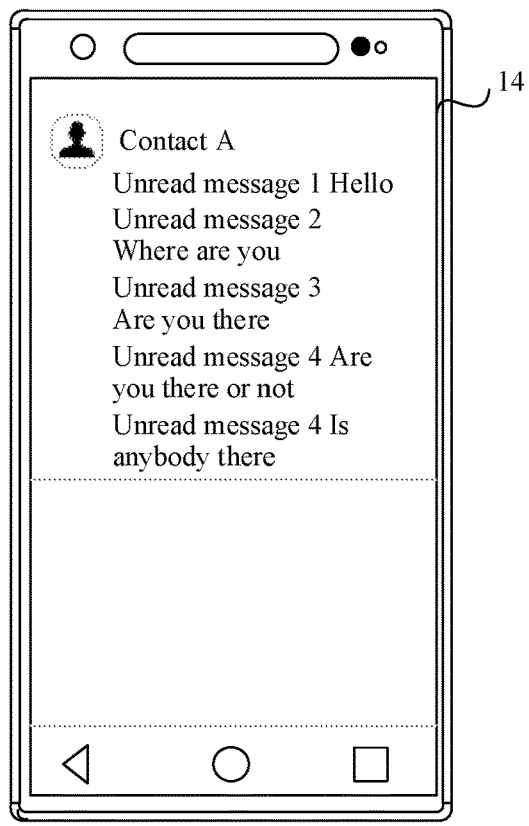
FIG. 8A is a fifth schematic diagram of an example of an interface of the mobile phone according to an embodiment of the present disclosure.
Figure 8B:
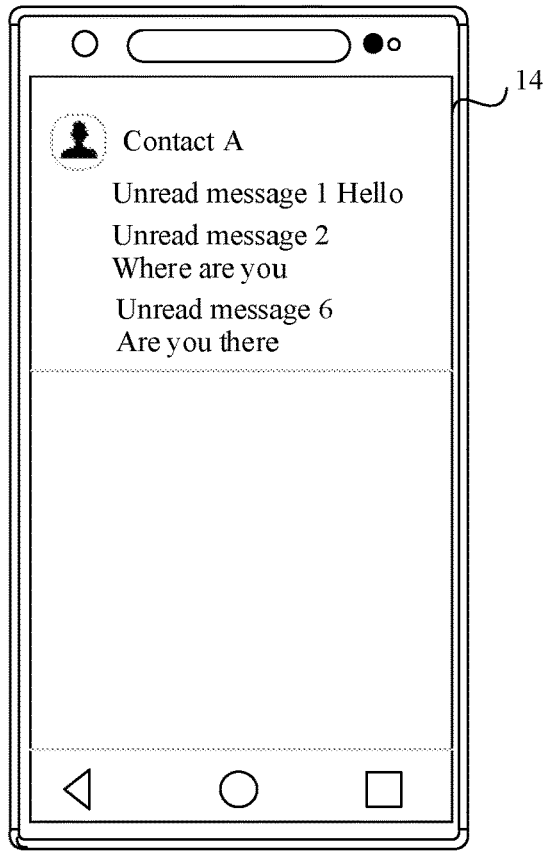
FIG. 8B is a sixth schematic diagram of an example of an interface of the mobile phone according to an embodiment of the present disclosure.

For example, as shown in FIG. 8A, an unread message management window 14 of the mobile phone includes unread messages 1 to 5 from a contact A. In a case that the mobile phone determines that the unread messages 3 to 5 from the contact A have a same (or similar) semantic meaning, the mobile phone may combine the unread messages 3 to 5 from the contact A into an unread message 6. As shown in FIG. 8B, the mobile phone may display the unread messages 1, 2, and 6 in a display area corresponding to the contact A.

Optionally, in this embodiment of the present disclosure, in a case that a message of a target type in at least one type of message includes at least two pictures, the terminal device may display thumbnails of the at least two pictures in a stacked manner.

Optionally, in this embodiment of the present disclosure, after the terminal device displays thumbnails of at least two pictures in a stacked manner, the user may perform a sliding input (for example, a leftward sliding input or a rightward sliding input) for the thumbnails of the at least two pictures, to trigger the terminal device to switch display between the thumbnails of the at least two pictures.

Optionally, in this embodiment of the present disclosure, after the terminal device displays thumbnails of at least two pictures in a stacked manner, the user may perform an input (for example, a tap operation) for any of the thumbnails of the at least two pictures, to trigger the terminal device to display a picture corresponding to the thumbnail.

Optionally, in this embodiment of the present disclosure, when displaying a picture corresponding to a thumbnail, the terminal device may cover an edge area of the picture corresponding to the thumbnail with shadow, that is, the edge area is a shadow area. The user may perform an input in the shadow area, to trigger the terminal device to display thumbnails of at least two pictures.

Figure 9A:
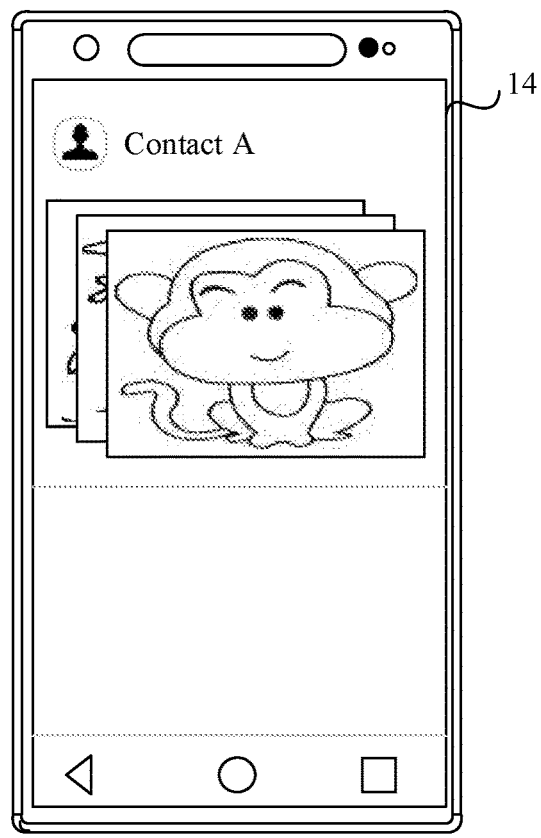
FIG. 9A is a seventh schematic diagram of an example of an interface of the mobile phone according to an embodiment of the present disclosure.
Figure 9B:
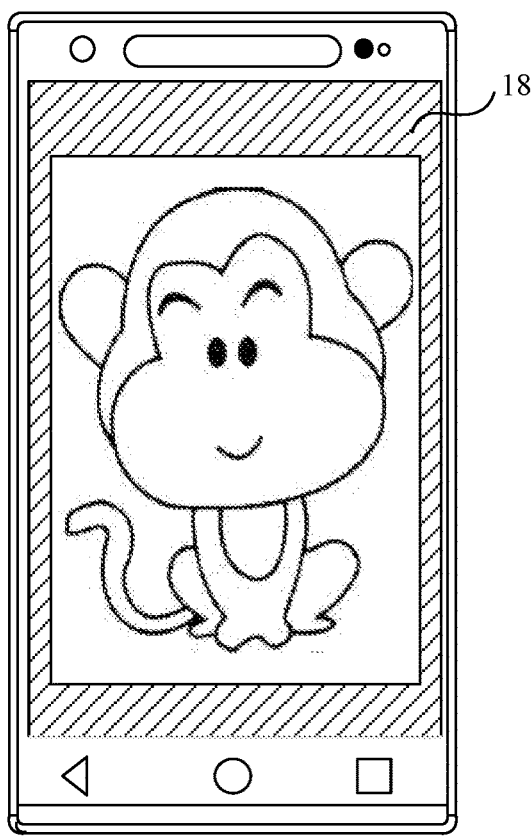
FIG. 9B is an eighth schematic diagram of an example of an interface of the mobile phone according to an embodiment of the present disclosure.

For example, in a case that there are at least two pictures in an unread message from a contact A, as shown in FIG. 9A, the mobile phone displays thumbnails of the at least two pictures in a stacked manner in an unread message management window 14. After the user performs an input for one of the thumbnails of the at least two pictures, as shown in FIG. 9B, the mobile phone displays, in the unread message management window 14, a picture corresponding to the thumbnail, and covers an edge area 18 of the picture corresponding to the thumbnail with shadow. After the user performs an input in the edge area 18, the mobile phone may restore display of the thumbnails of the at least two pictures, as shown in FIG. 9A.

It may be understood that, the unread message management window includes messages of at least one type, messages of each type include at least one unread message in an unread message group, and messages of a same type meet at least one of the following conditions: the messages are sent by a same contact or the messages have a same characteristic, where a characteristic of each message is determined based on at least one of the following: a keyword of the message, semantic information of the message, or format information of the message.

Optionally, in this embodiment of the present disclosure, when the terminal device currently displays the unread message management window, if the terminal device receives a message via the first application, the terminal device may determine a display area of the received message in the unread message management window based on a state (for example, a read state, a reading state, or a unread state) of messages in the unread message management window.

Figure 10A:
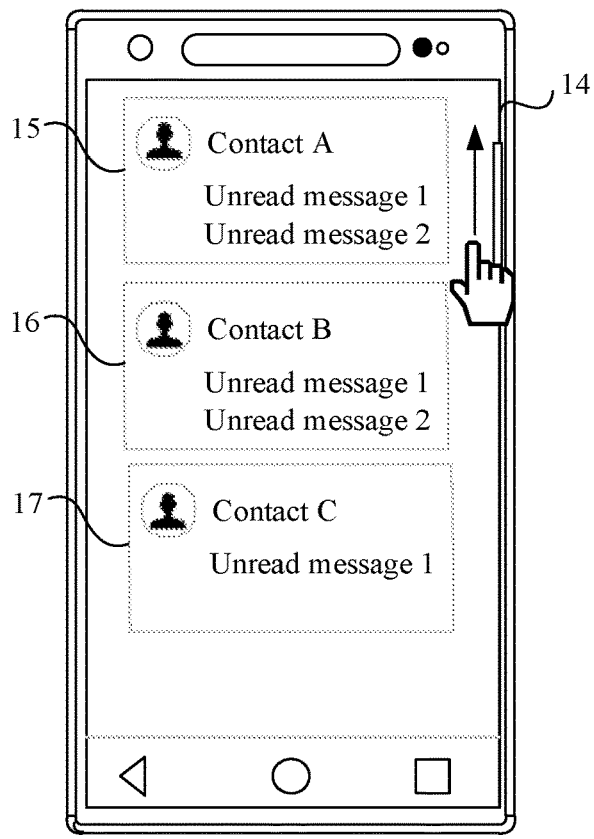
FIG. 10A is a ninth schematic diagram of an example of an interface of the mobile phone according to an embodiment of the present disclosure.
Figure 10B:
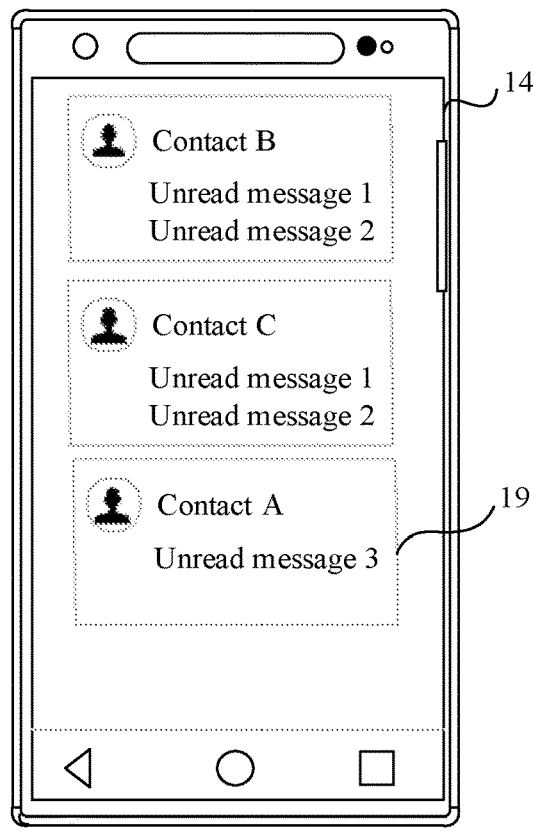
FIG. 10B is a tenth schematic diagram of an example of an interface of the mobile phone according to an embodiment of the present disclosure.

For example, as shown in FIG. 10A, the mobile phone displays an unread message management window 14. The unread message management window 14 includes unread messages 1 and 2 from a contact A that are displayed in an area 15, unread messages 1 and 2 from a contact B that are displayed in an area 16, and an unread message 1 from a contact C that is displayed in an area 17. In a case that the user performs a sliding input (for example, an upward sliding input) in the unread message management window 14, as shown in FIG. 10B, the mobile phone deletes, from the unread message management window 14, the unread messages 1 and 2 from the contact A (that is, the unread message management window 14 currently does not display the unread messages 1 and 2 from the contact A, in other words, the unread messages 1 and 2 from the contact A are in a read state). In a case that the mobile phone receives an unread message 3 from the contact A, the mobile phone may display the unread message 3 from the contact A in an area 19 below the area 17.

Figure 11:
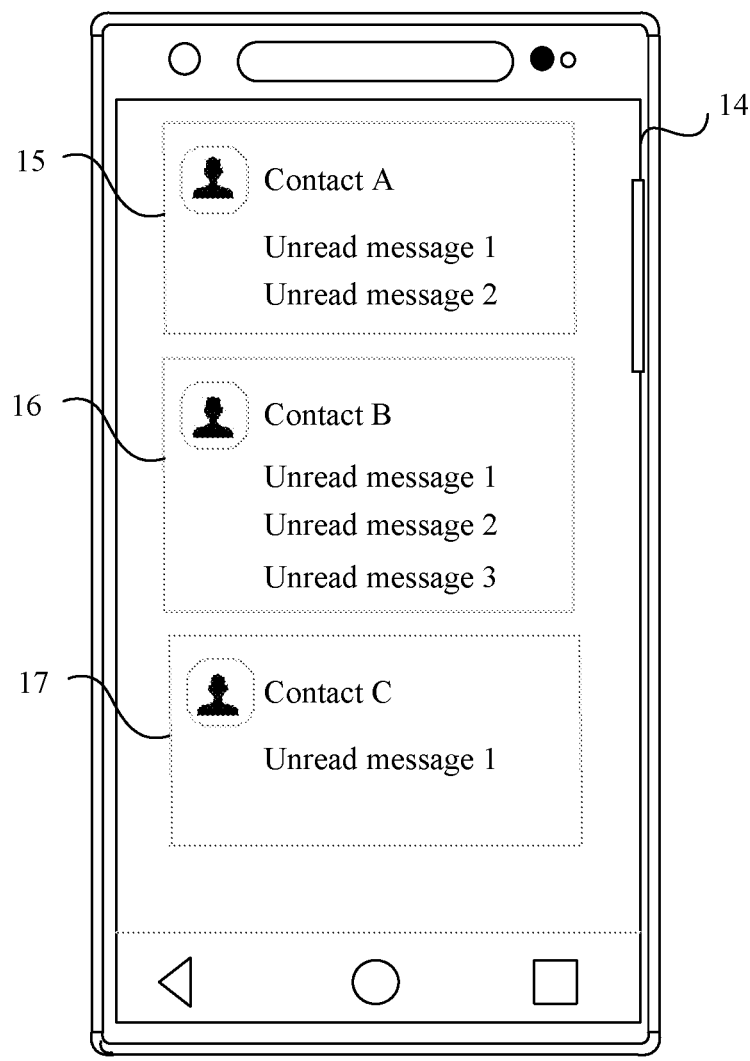
FIG. 11 is a eleventh schematic diagram of an example of an interface of the mobile phone according to an embodiment of the present disclosure.

For another example, with reference to FIG. 10A, as shown in FIG. 11, in a case that the mobile phone receives an unread message 3 from a contact B, the mobile phone may display the unread message 3 from the contact B in an area 16.

Figure 12:
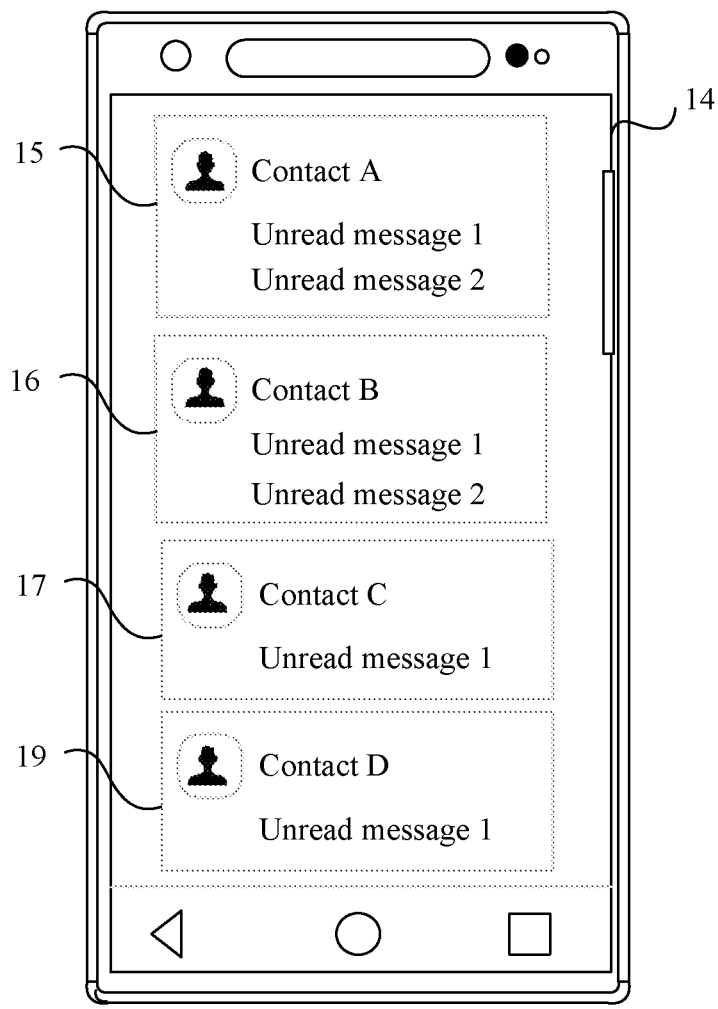
FIG. 12 is an twelfth schematic diagram of an example of an interface of the mobile phone according to an embodiment of the present disclosure.

For still another example, with reference to FIG. 10A, as shown in FIG. 12, in a case that the mobile phone receives an unread message 1 from a contact D, the mobile phone may display the unread message 1 from the contact D in an area 19 below an area 17.

Figure 13:
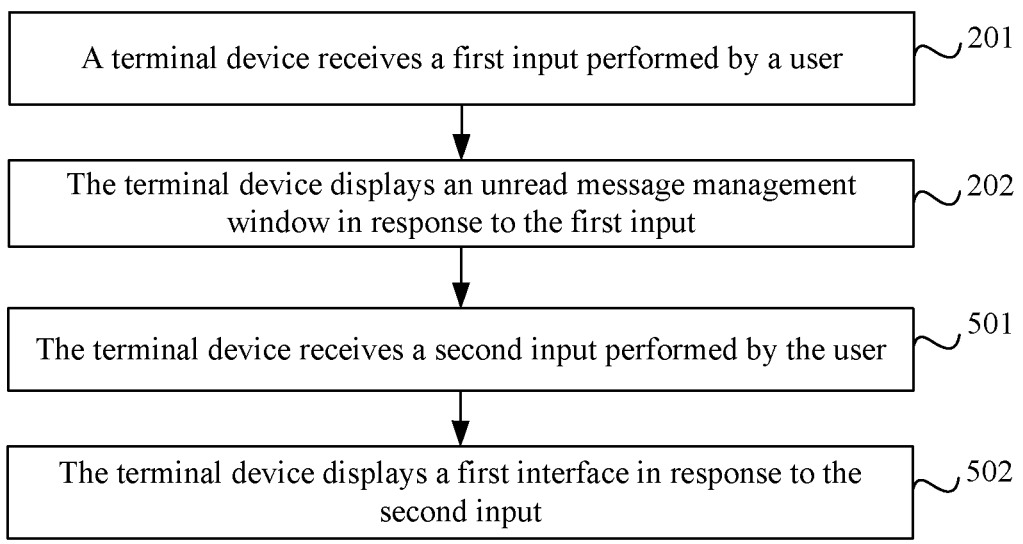
FIG. 13 is a fourth schematic diagram of the unread message management method according to an embodiment of the present disclosure.

Optionally, in this embodiment of the present disclosure, a message interaction window indicated by N labels in the first interface includes M unread messages, and both N and M are positive integers. With reference to FIG. 2, as shown in FIG. 13, after step 202, the unread message management method provided in this embodiment of the present disclosure further includes the following steps 501 and 502.

Step 501: The terminal device receives a second input performed by the user.

Optionally, in this embodiment of the present disclosure, the second input may be an input performed by the user in the unread message management window, to trigger the terminal device to display the first interface.

Optionally, in this embodiment of the present disclosure, the second input may be a sliding input (for example, a leftward sliding input or a rightward sliding input) or a tap operation (for example, tapping an Exit icon) performed by the user in the unread message management window.

Step 502: The terminal device displays a first interface in response to the second input.

In this embodiment of the present disclosure, after display is switched from the unread message management window to the first interface, all messages in a message interaction window indicated by K labels are in a read state, the K labels are labels of the N labels, the message in the message interaction window indicated by the K labels is a message that is of the M unread messages and that is in an area visible to the user when the unread message management window is displayed, and K is a positive integer less than or equal to N.

It may be understood that, after the display is switched from the unread message management window to the first interface, K labels corresponding to messages that have been displayed in an area currently visible to the user in the unread message management window are all in a read state in the first interface.

It should be noted that, the area visible to the user may be understood as an area that can display content of a message and that is in a current interface on a display screen of the terminal device.

Optionally, in this embodiment of the present disclosure, identifiers (for example, digital identifiers) on the K labels in the first interface are all cleared.

It should be noted that, for descriptions of the first interface, refer to the description of the foregoing embodiment, and details are not described herein again.

In this embodiment of the present disclosure, after triggering, via the first input, the terminal device to display the unread message management window, the user may trigger, via the second input, the terminal device to quickly change a state of a message in a message interaction window indicated by at least one label (that is, the K labels) in the first interface into a read state. In this way, an operation of the user can be simplified, and time consumed in a process of changing a state of at least one unread message is reduced.

Optionally, in this embodiment of the present disclosure, after step 202, the unread message management method provided in this embodiment of the present disclosure further includes the following steps 601 and 602.

Step 601: The terminal device receives a third input performed by the user.

In this embodiment of the present disclosure, the third input is an input performed for a first display area, the first display area is one of the at least one display area, and an unread message in the first display area is a message sent by a second contact.

Optionally, in this embodiment of the present disclosure, the third input may be an input performed by the user in a first area, and the first area is an area that is in the first display area and that is different from an area where message content is displayed.

Optionally, in this embodiment of the present disclosure, the third input may be a tap operation performed by the user in the first area. The tap operation may be a single-tap operation, a double-tap operation, or a plurality of continuous operations. Specifically, this may be determined based on an actual use requirement, and is not limited in this embodiment of the present disclosure.

Optionally, in this embodiment of the present disclosure, the first area includes a control (the control may be used to display a message interaction window), and the third input may be a tap operation performed by the user for the control in the first area.

Optionally, in this embodiment of the present disclosure, the third input may be a selection input performed by the user for a first unread message, and the first unread message is displayed in the first display area (that is, the first unread message is an unread message in the first display area).

Optionally, in this embodiment of the present disclosure, the third input may be a tap operation performed by the user for a first unread message.

Step 602: The terminal device performs a target action in response to the third input.

In this embodiment of the present disclosure, the target action may be either of displaying a second message interaction window or displaying an input control in the unread message management window, the second message interaction window is a window for the user to perform message interaction with the second contact, and the input control is used for the user to enter content of a message to be sent to the second contact.

Optionally, in this embodiment of the present disclosure, the third input may be an input performed by the user in the first area, the target action is displaying the second message interaction window, and the first area is an area that is in the first display area and that is different from an area where message content is displayed.

Optionally, in this embodiment of the present disclosure, the third input may be a selection input performed by the user for a first unread message, the target action is displaying an input control in the unread message management window, and the first unread message is displayed in the first display area (that is, the first unread message is an unread message in the first display area).

Certainly, in actual application, in a case that the third input is an input performed by the user in the first area, the target action may alternatively be displaying an input control in the unread message management window; or in a case that the third input is a selection input performed by the user for a first unread message, the target action may alternatively be displaying the second message interaction window. Specifically, this may be determined based on an actual use requirement, and is not limited in this embodiment of the present disclosure.

Optionally, in this embodiment of the present disclosure, after the user enters, via the input control, content of a message to be sent to the second contact, the terminal device may display, in the unread message management window, the content entered by the user.

Figure 14A:
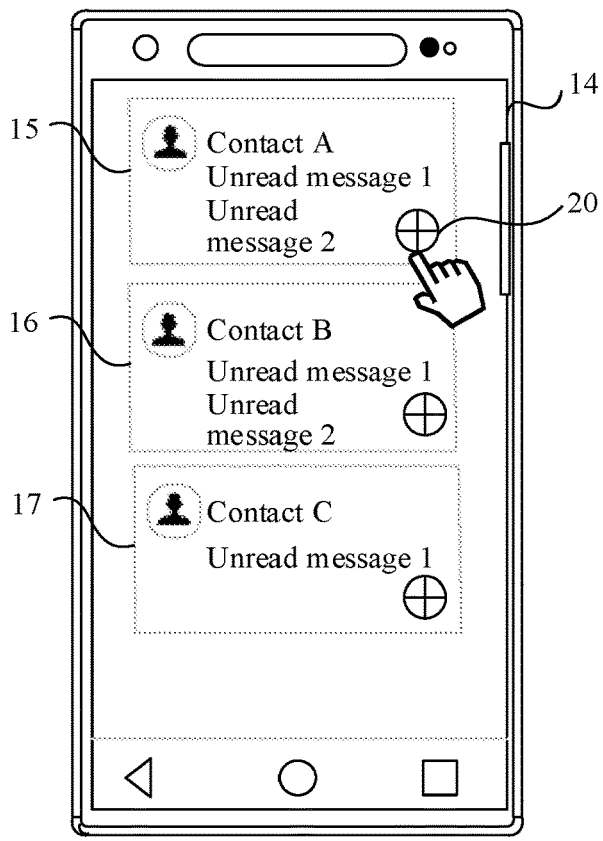
FIG. 14A is a thirteenth schematic diagram of an example of an interface of the mobile phone according to an embodiment of the present disclosure.
Figure 14B:
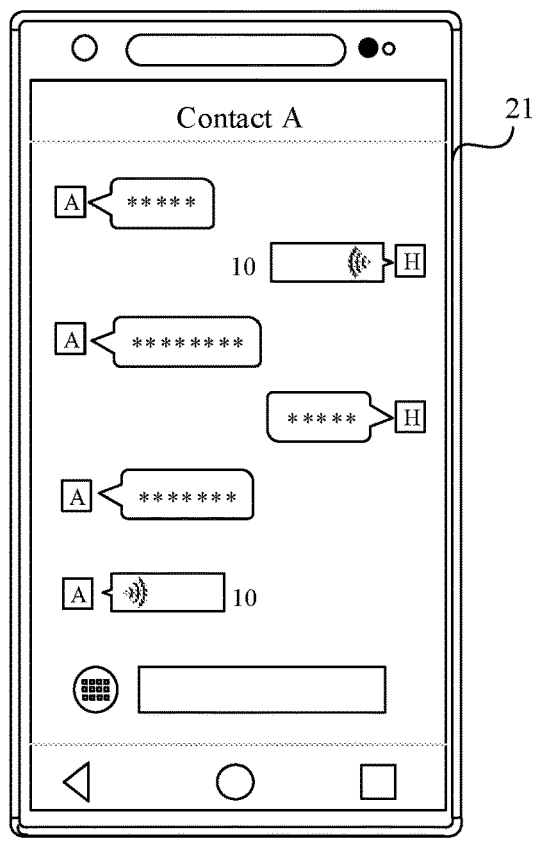
FIG. 14B is a fourteenth schematic diagram of an example of an interface of the mobile phone according to an embodiment of the present disclosure.

For example, as shown in FIG. 14A, the mobile phone displays an unread message management window 14. The unread message management window 14 includes unread messages 1 and 2 from a contact A that are displayed in an area 15, unread messages 1 and 2 from a contact B that are displayed in an area 16, and an unread message 1 from a contact C that is displayed in an area 17, and each of the area 15 to the area 17 includes a control 20. After the user performs a third input for the control 20 in the area 15, as shown in FIG. 14B, the mobile phone displays a message interaction window 21, and the message interaction window 21 is a window used for the user (for example, a contact H) to perform message interaction with the contact A.

Figure 15:
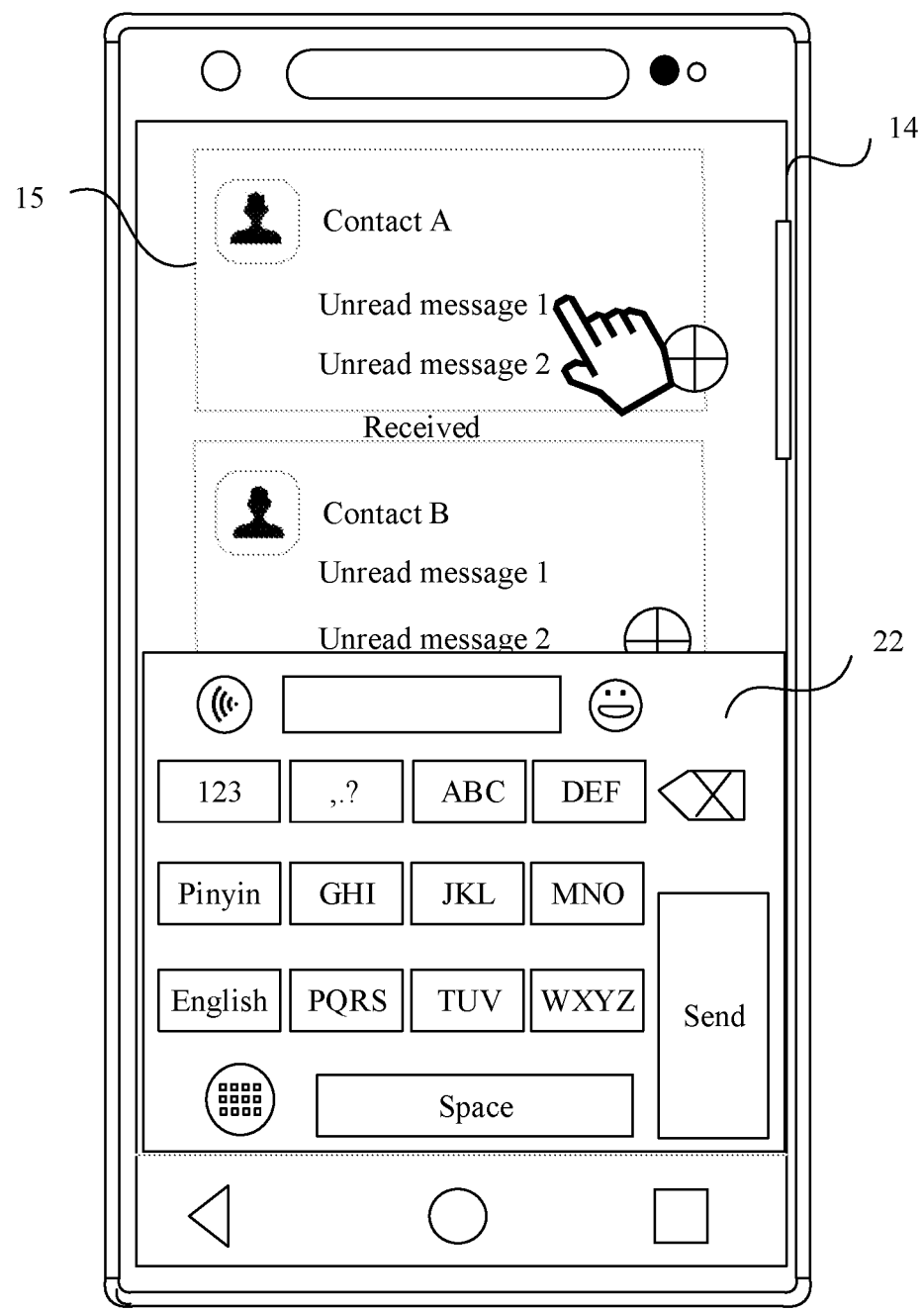
FIG. 15 is a fifteenth schematic diagram of an example of an interface of the mobile phone according to an embodiment of the present disclosure.

For another example, with reference to FIG. 14A, after the user performs a third input for an unread message 1 from a contact A in the area 15, as shown in FIG. 15, the mobile phone displays an input control 22 in the unread message management window 14. After the user enters, via the input control 22, content of a message to be sent to the contact A, the mobile phone may display, in the unread message management window 14, the content entered by the user.

In this embodiment of the present disclosure, the user may perform the third input in the first display area in the unread message management window, to enable the terminal device to display the second message interaction window, or display the input control in the unread message management window, so that the user can quickly perform message interaction with the second contact, thereby improving human-computer interaction performance.

Figure 16:
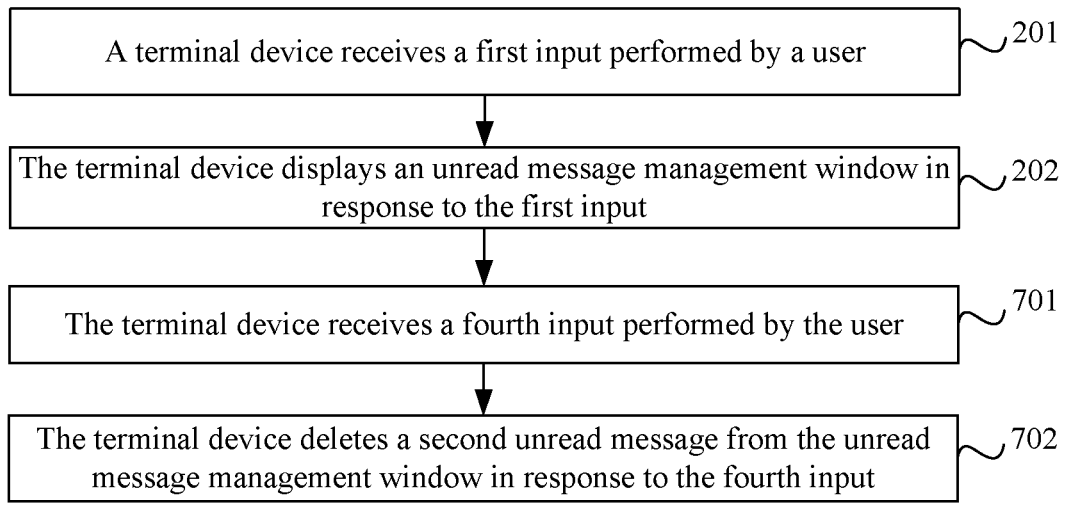
FIG. 16 is a fifth schematic diagram of the unread message management method according to an embodiment of the present disclosure.

Optionally, in this embodiment of the present disclosure, with reference to FIG. 2, as shown in FIG. 16, after step 202, the unread message management method provided in this embodiment of the present disclosure further includes the following steps 701 and 702.

Step 701: The terminal device receives a fourth input performed by the user.

In this embodiment of the present disclosure, the fourth input is an input performed by the user for a second unread message, the second unread message is an unread message in an unread message group, and the unread message group is one of the plurality of unread message groups.

In this embodiment of the present disclosure, the fourth input is used to trigger the terminal device to delete the second unread message from the unread message management window.

Optionally, in this embodiment of the present disclosure, the fourth input may be a sliding input (for example, a leftward sliding input or a rightward sliding input) performed by the user for the second unread message.

Step 702: The terminal device deletes the second unread message from the unread message management window in response to the fourth input.

In this embodiment of the present disclosure, after the second unread message is deleted from the unread message management window, and the display is switched from the unread message management window to the first interface, a state of the second unread message in a third message interaction window remains unchanged, where the third message interaction window is a message interaction window that is in the first interface and that is indicated by a first label.

It should be noted that, that a state of the second unread message remains unchanged may be understood as: the second unread message is still in an unread state.

Optionally, in this embodiment of the present disclosure, after the second unread message is deleted from the unread message management window, and the display is switched from the unread message management window to the first interface, an identifier (for example, a digital identifier) for the first label in the first interface is not cleared.

Optionally, in this embodiment of the present disclosure, the user may perform an input in a display area where the second unread message is displayed in the unread message management window, to trigger the terminal device to delete a third unread message (the third unread message refers to all unread messages sent by a contact that sends the second unread message) from the unread message management window. In addition, after the third unread message is deleted from the unread message management window, and the display is switched from the unread message management window to the first interface, the third unread message in the third message interaction window is still in an unread state.

Figure 17A:
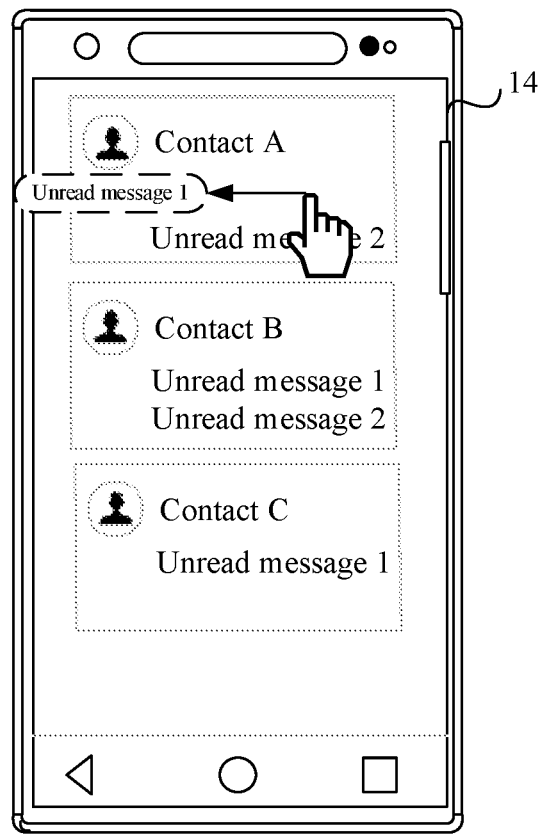
FIG. 17A is an sixteenth schematic diagram of an example of an interface of the mobile phone according to an embodiment of the present disclosure.
Figure 17B:
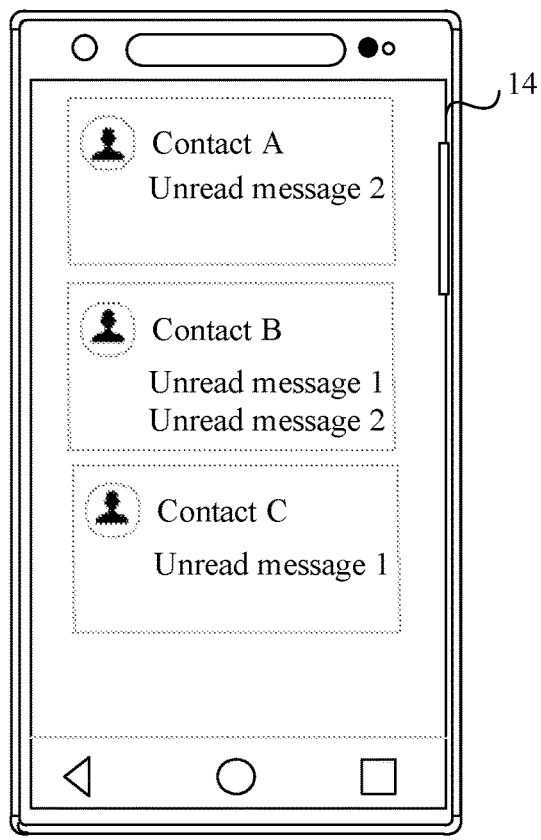
FIG. 17B is an seventeenth schematic diagram of an example of an interface of the mobile phone according to an embodiment of the present disclosure.

For example, with reference to FIG. 14A, as shown in FIG. 17A, the user may perform a fourth input (for example, a leftward sliding input) for an unread message 1 from a contact A, so that the mobile phone may delete, from an unread message management window 14, the unread the message 1 from the contact A, as shown in FIG. 17B, in this case, the unread message management window 14 displays an unread message 2 from the contact A, unread messages 1 and 2 from a contact B, and an unread message 1 from a contact C.

In this embodiment of the present disclosure, the user may perform the fourth input for the second unread message in the unread message management window, to enable the terminal device to delete the second unread message from the unread message management window, so that the second unread message in a third message interaction window indicated by a second label in the first interface is still in an unread state, thereby improving flexibility of the terminal device for managing received unread messages.

Figure 18:
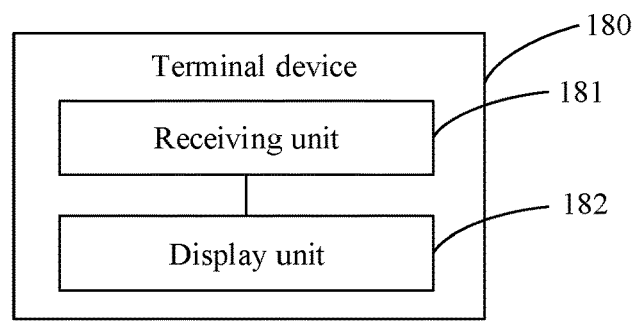
FIG. 18 is a first schematic structural diagram of a terminal device according to an embodiment of the present disclosure.

FIG. 18 is a possible schematic structural diagram of a terminal device according to an embodiment of the present disclosure. As shown in FIG. 18, the terminal device 180 may include a receiving unit 181 and a display unit 182;

the receiving unit 181 is configured to receive a first input performed by a user, where the first input is an input performed by the user for a target identifier in a first interface; and the display unit 182 is configured to display an unread message management window in response to the first input received by the receiving unit 181, where the unread message management window includes a plurality of unread message groups, and each unread message group includes at least one unread message.

Figure 19:
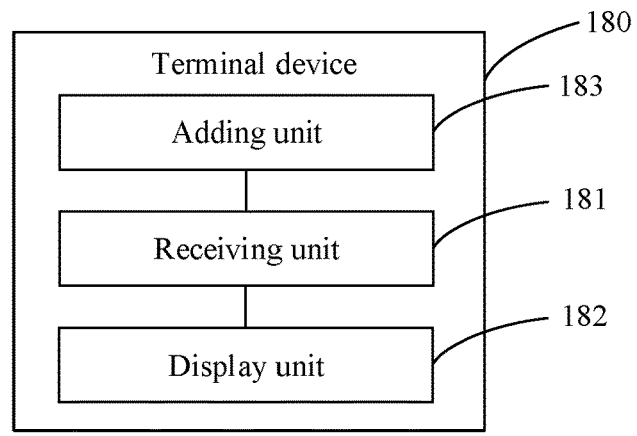
FIG. 19 is a second schematic structural diagram of the terminal device according to an embodiment of the present disclosure.

In a possible implementation, the first interface is a user interface of a first application, and the unread message management window is a window of the first application. The receiving unit 181 is configured to receive a first message before the receiving unit 181 receives the first input performed by the user, where the first message is a message received via the first application. With reference to FIG. 18, as shown in FIG. 19, the terminal device 180 provided in this embodiment of the present disclosure may further include an adding unit 183. The adding unit 183 is configured to add the first message received by the receiving unit 181 into the unread message management window.

In a possible implementation, the adding unit 183 may be configured to: in a case that a first contact is not a target contact, add the first message into each of a first message interaction window and the unread message management window, where the first contact is a contact that sends the first message, the first message interaction window is a window that is of the first application and that is used for the user to perform message interaction with the first contact, and a message sent by the target contact is prohibited from being added into the unread message management window.

In a possible implementation, the adding unit 183 may be configured to: in a case that the first contact is the target contact, add the first message into the first message interaction window, and prohibit the first message from being added into the unread message management window.

In a possible implementation, a message interaction window indicated by N labels in the first interface includes M unread messages, and both N and M are positive integers. The receiving unit 181 is further configured to: after the display unit 182 displays the unread message management window, receive a second input performed by the user. The display unit 182 is further configured to display the first interface in response to the second input received by the receiving unit 181. After display is switched from the unread message management window to the first interface, all messages in a message interaction window indicated by K labels are in a read state, the K labels are labels of the N labels, the message in the message interaction window indicated by the K labels is a message that is of the M unread messages and that is in an area visible to the user when the unread message management window is displayed, and K is a positive integer less than or equal to N.

In a possible implementation, the unread message management window includes at least one display area, and each display area displays at least one unread message in an unread message group. All unread messages in each display area are sent by a same contact; or all unread messages in each display area have a same characteristic, and a characteristic of each message is determined based on at least one of the following: a keyword of the message, semantic information of the message, or format information of the message.

In a possible implementation, the receiving unit 181 is further configured to: after the display unit 182 displays the unread message management window, receive a third input performed by the user, where the third input is an input performed for a first display area, the first display area is one of the at least one display area, and an unread message in the first display area is a message sent by a second contact. The display unit 182 is further configured to perform a target action in response to the third input received by the receiving unit 181, where the target action is either of displaying a second message interaction window or displaying an input control in the unread message management window, the second message interaction window is a window for the user to perform message interaction with the second contact, and the input control is used for the user to enter content of a message to be sent to the second contact.

In a possible implementation, the third input may be an input performed by the user in a first area, the target action is displaying the second message interaction window, and the first area is an area that is in the first display area and that is different from an area where message content is displayed. Alternatively, the third input may be a selection input performed by the user for a first unread message, the target action is displaying an input control in the unread message management window, and the first unread message is displayed in the first display area.

Figure 20:
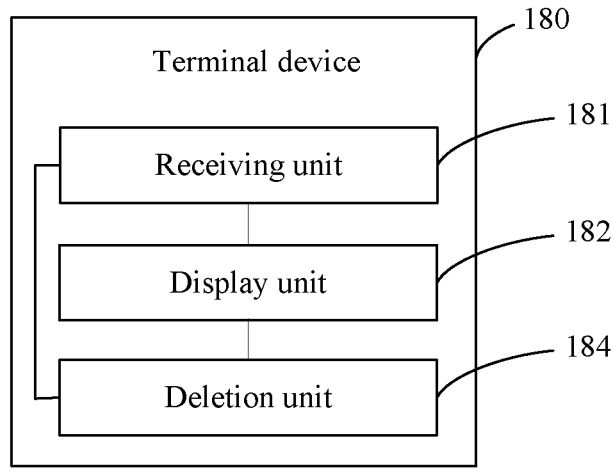
FIG. 20 is a third schematic structural diagram of the terminal device according to an embodiment of the present disclosure.

In a possible implementation, the receiving unit 181 is further configured to: after the display unit 182 displays the unread message management window, receive a fourth input performed by the user, where the fourth input is an input performed by the user for a second unread message, and the second unread message is an unread message in an unread message group. With reference to FIG. 18, as shown in FIG. 20, the terminal device 180 provided in this embodiment of the present disclosure may further include a deletion unit 184. The deletion unit 184 is configured to delete the second unread message from the unread message management window in response to the fourth input received by the receiving unit 181. After the second unread message is deleted from the unread message management window, and display is switched from the unread message management window to the first interface, a state of the second unread message in a third message interaction window remains unchanged, where the third message interaction window is a message interaction window that is in the first interface and that is indicated by a first label.

The terminal device provided in this embodiment of the present disclosure can implement the processes implemented by the terminal device in the foregoing method embodiment. To avoid repetition, details are not described herein again.

According to the terminal device provided in this embodiment of the present disclosure, the user may directly perform the first input for the target identifier, to enable the terminal device to display the unread message management window, so that the user can find a required unread message from a plurality of unread messages in the unread message management window, without a need to search a plurality of labels (the plurality of labels include a label corresponding to an unread message and a label corresponding to a read message) in an interface of the first application one by one. In this way, an operation of the user can be simplified, time consumed in a search process can be reduced, and human-computer interaction performance can be improved.

Figure 21:
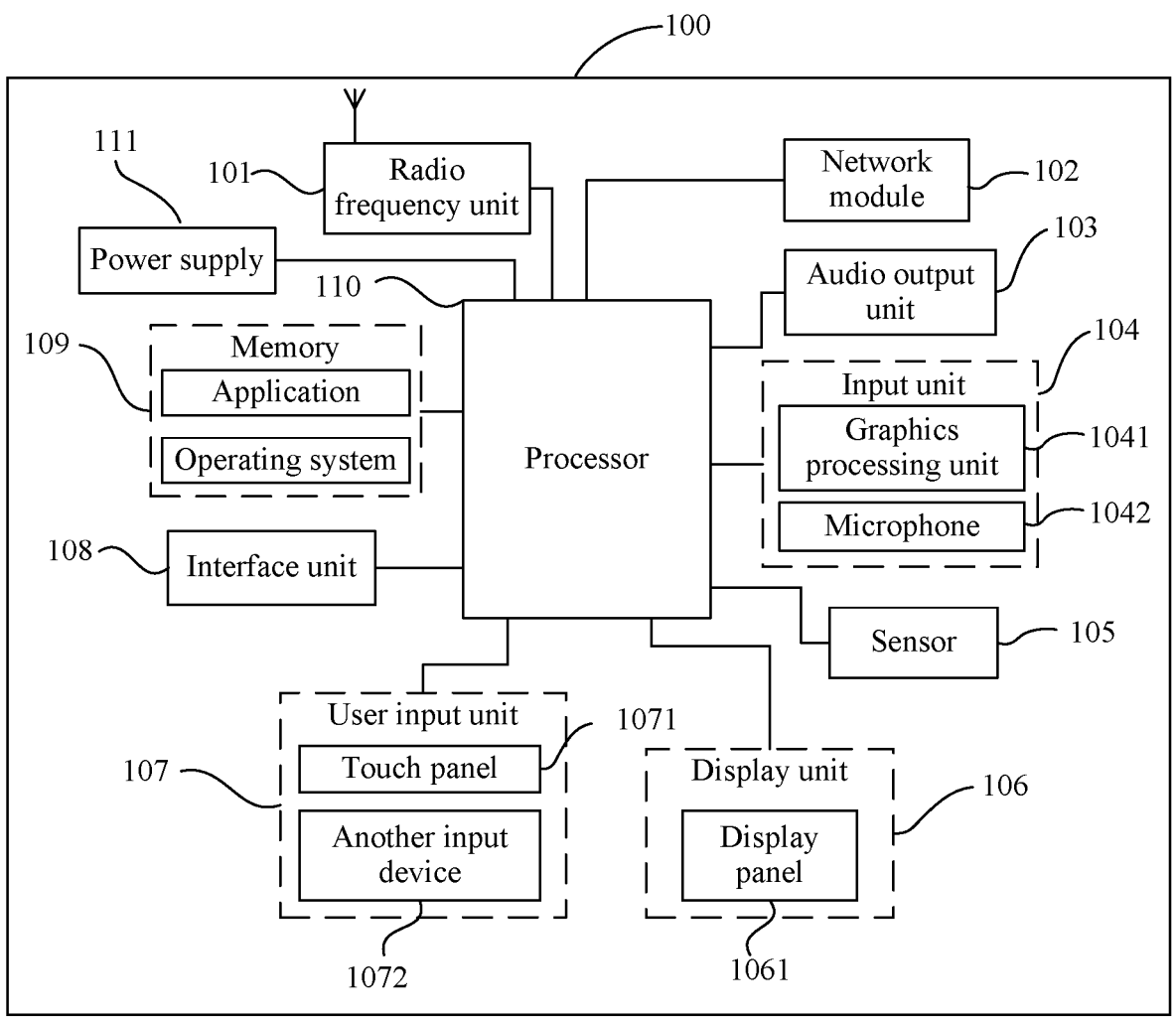
FIG. 21 is a schematic diagram of hardware of a terminal device according to an embodiment of the present disclosure.

FIG. 21 is a schematic diagram of hardware of a terminal device implementing the embodiments of the present disclosure. As shown in FIG. 21, the terminal device 100 includes but is not limited to components such as a radio frequency unit 101, a network module 102, an audio output unit 103, an input unit 104, a sensor 105, a display unit 106, a user input unit 107, an interface unit 108, a memory 109, a processor 110, and a power supply 111.

It should be noted that, a person skilled in the art may understand that the structure of the terminal device shown in FIG. 21 does not constitute a limitation to the terminal device. The terminal device may include more or fewer components than those shown in the figure, or some components may be combined, or there may be a different component arrangement. In this embodiment of the present disclosure, the terminal device includes but is not limited to a mobile phone, a tablet computer, a notebook computer, a palmtop computer, a vehicle-mounted terminal, a wearable device, a pedometer, or the like.

The radio frequency unit 101 is configured to receive a first input performed by a user, where the first input is an input performed by the user for a target identifier in a first interface.

The processor 110 is configured to display an unread message management window in response to the first input received by the radio frequency unit 101, where the unread message management window includes a plurality of unread message groups, and each unread message group includes at least one unread message.

According to the terminal device provided in this embodiment of the present disclosure, the user may directly perform the first input for the target identifier, to enable the terminal device to display the unread message management window, so that the user can find a required unread message from a plurality of unread messages in the unread message management window, without a need to search a plurality of labels (the plurality of labels include a label corresponding to an unread message and a label corresponding to a read message) in an interface of the first application one by one. In this way, an operation of the user can be simplified, time consumed in a search process can be reduced, and human-computer interaction performance can be improved.

It should be understood that, in this embodiment of the present disclosure, the radio frequency unit 101 may be configured to receive and transmit information, or receive and transmit signals during a call. For example, the radio frequency unit 101 receives downlink data from a base station, and transmits the downlink data to the processor 110 for processing; and in addition, transmits uplink data to the base station. Generally, the radio frequency unit 101 includes, but is not limited to, an antenna, at least one amplifier, a transceiver, a coupler, a low noise amplifier, and a duplexer, and the like. In addition, the radio frequency unit 101 may also communicate with a network and another device through a radio communications system.

The terminal device provides a user with wireless broadband Internet access through the network module 102, for example, helps the user receive and send emails, browse web pages, and access streaming media.

The audio output unit 103 can convert audio data received by the radio frequency unit 101 or the network module 102 or stored in the memory 109 into an audio signal, and output the audio signal as sound. Moreover, the audio output unit 103 may further provide audio output (for example, call signal receiving sound and message receiving sound) related to a specific function performed by the terminal device 100. The audio output unit 103 includes a speaker, a buzzer, a telephone receiver, and the like.

The input unit 104 is configured to receive audio or video signals. The input unit 104 may include a graphics processing unit (GPU) 1041 and a microphone 1042, and the graphics processing unit 1041 processes image data of a still picture or a video obtained by an image capture apparatus (such as a camera) in a video capture mode or an image capture mode. A processed image frame may be displayed on the display unit 106. The image frame processed by the graphics processor 1041 may be stored in the memory 109 (or another storage medium) or sent by using the radio frequency unit 101 or the network module 102. The microphone 1042 may receive sound and may process such sound into audio data. The processed audio data may be converted, in a call mode, into a format that may be transmitted to a mobile communication base station by using the radio frequency unit 101 for output.

The terminal device 100 further includes at least one sensor 105, such as an optical sensor, a motion sensor, and other sensors. The optical sensor includes an ambient light sensor and a proximity sensor. The ambient light sensor may adjust luminance of the display panel 1061 based on brightness of ambient light. The proximity sensor may turn off the display panel 1061 and/or backlight when the terminal device 100 approaches an ear. As a type of the motion sensor, an accelerometer sensor may detect an acceleration in each direction (generally, three axes), and detect a value and a direction of gravity when the accelerometer sensor is static, and may be configured to recognize a terminal device posture (such as screen switching between landscape and portrait modes, a related game, or magnetometer posture calibration), a function related to vibration recognition (such as a pedometer or a knock), and the like. The sensor 105 may further include a fingerprint sensor, a pressure sensor, an iris sensor, a molecular sensor, a gyroscope, a barometer, a hygrometer, a thermometer, and an infrared sensor. Details are not described herein.

The display unit 106 is configured to display information inputted by a user or information provided to a user. The display unit 106 may include a display panel 1061, and the display panel 1061 may be configured in a form of a liquid crystal display (LCD), an organic light-emitting diode (OLED), or the like.

The user input unit 107 may be configured to receive input numeral or character information, and generate key signal input related to user setting and function control of the terminal device. The user input unit 107 includes a touch panel 1071 and another input device 1072. The touch panel 1071, also referred to as a touchscreen, may collect a touch operation performed by the user on or near the touch panel 1071 (for example, an operation performed by the user on or near the touch panel 1071 by using any proper object or accessory such as a finger or a stylus). The touch panel 1071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, sends the touch point coordinates to a processor 110, and receives and executes a command sent by the processor 110. In addition, the touch panel 1071 may be implemented by using a plurality of types such as a resistive type, a capacitive type, an infrared ray type, and a surface acoustic wave type. In addition to the touch panel 1071, the user input unit 107 may further include the another input device 1072. The another input device 1072 may include but is not limited to a physical keyboard, a function key (such as a volume control key or an on/off key), a trackball, a mouse, and a joystick. Details are not described herein again.

Optionally, the touch panel 1071 may cover the display panel 1061. When detecting a touch operation on or near the touch panel 1071, the touch panel 1071 transmits the touch operation to the processor 110 to determine a type of a touch event. Then, the processor 110 provides corresponding visual output on the display panel 1061 based on the type of the touch event. Although in FIG. 21, the touch panel 1071 and the display panel 1061 are configured as two independent components to implement input and output functions of the terminal device, in some embodiments, the touch panel 1071 and the display panel 1061 can be integrated to implement the input and output functions of the terminal device. Details are not limited herein.

The interface unit 108 is an interface for connecting an external apparatus to the terminal device 100. For example, the external apparatus may include a wired or wireless headset jack, an external power supply (or a battery charger) port, a wired or wireless data port, a storage card port, a port for connecting an apparatus having an identification module, an audio input/output (I/O) port, a video I/O port, a headset jack, or the like. The interface unit 108 may be configured to receive an input (for example, data information or power) from an external apparatus and transmit the received input to one or more elements in the terminal device 100, or transmit data between the terminal device 100 and the external apparatus.

The memory 109 may be configured to store a software program and various data. The memory 109 may mainly include a program storage area and a data storage area. The program storage area may store an operating system, an application required for at least one function (for example, a sound playback function or an image playback function), and the like. The data storage area may store data (for example, audio data or an address book) or the like created based on use of the mobile phone. In addition, the memory 109 may include a high-speed random access memory, or may include a nonvolatile memory, for example, at least one disk storage device, a flash memory, or another volatile solid-state storage device.

The processor 110 is a control center of the terminal device, connects various parts of the entire terminal device by using various interfaces and circuits, and performs various functions of the terminal device and processes data by running or executing the software programs and/or the modules stored in the memory 109 and invoking data stored in the memory 109, so as to monitor the terminal device as a whole. The processor 110 may include one or more processing units. Optionally, an application processor and a modem processor may be integrated into the processor 110. The application processor mainly processes an operating system, a user interface, an application, and the like. The modem processor mainly processes wireless communication. It can be understood that the above-mentioned modem processor may not be integrated in the processor 110.

The terminal device 100 may further include the power supply 111 (such as a battery) that supplies power to each component. Optionally, the power supply 111 may be logically connected to the processor 110 by using a power management system, to implement functions such as charging, discharging, and power consumption management by using the power management system.

In addition, the terminal device 100 includes some function modules not shown, and details are not described herein.

Optionally, the embodiments of the present disclosure further provide a terminal device, including the processor 110 and the memory 109 shown in FIG. 21, and a computer program that is stored in the memory 109 and executable on the processor 110. When the computer program is executed by the processor 110, the processes of the foregoing method embodiment are implemented and a same technical effect can be achieved. To avoid repetition, details are not described herein again.

The embodiments of the present disclosure further provide a non-transitory computer-readable storage medium. The non-transitory computer-readable storage medium stores a computer program, and when the computer program is executed by a processor, the processes of the foregoing method embodiment are implemented and the same technical effect can be achieved. To avoid repetition, details are not described herein again. The non-transitory computer-readable storage medium may be a read-only memory (ROM), a random access memory (RAM), a magnetic disk, a compact disc, or the like.

It should be noted that in this specification, the terms "comprise", "include", and any other variants thereof are intended to cover non-exclusive inclusion, so that a process, a method, an article, or an apparatus that includes a series of elements not only includes these very elements, but also includes other elements not expressly listed, or also includes elements inherent to this process, method, article, or apparatus. Without being subject to further limitations, an element defined by a phrase "including a" does not exclude presence of other identical elements in the process, method, article, or apparatus that includes the very element.

According to the foregoing descriptions of the implementations, a person skilled in the art may clearly understand that the foregoing methods in the embodiments may be implemented by using software and a required universal hardware platform, or certainly may be implemented by using hardware. However, in many cases, the former is a better implementation. Based on such an understanding, the technical solutions of the present disclosure essentially, or the part contributing to the related technologies may be implemented in a form of a software product. The computer software product is stored in a storage medium (for example, a ROM/RAM, a magnetic disk, or a compact disc), and includes a plurality of instructions for instructing a terminal device (which may be a mobile phone, a computer, a server, an air conditioner, a network device, or the like) to perform the method described in the embodiments of this disclosure.

The embodiments of this disclosure are described above with reference to the accompanying drawings, but this disclosure is not limited to the foregoing implementations. The foregoing implementations are only illustrative rather than restrictive. Inspired by this disclosure, a person of ordinary skill in the art can still derive many variations without departing from the essence of this disclosure and the protection scope of the claims. All these variations shall fall within the protection of this disclosure.

What is claimed is:

1. An unread message management method, applied to a terminal device and comprising:
   receiving a first input performed by a user, wherein the first input is an input performed by the user for a target identifier in a first interface; and
   displaying an unread message management window in response to the first input, wherein the unread message management window comprises a plurality of unread message groups, and each unread message group comprises at least one unread message; wherein
   after the displaying an unread message management window, the method further comprises:
   receiving a fourth input performed by the user, wherein the fourth input is an input performed by the user for a second unread message, and the second unread message is an unread message in an unread message group; and
   deleting the second unread message from the unread message management window in response to the fourth input, wherein
   after the second unread message is deleted from the unread message management window, and display is switched from the unread message management window to the first interface, a state of the second unread message in a third message interaction window remains in an unread state, wherein the third message interaction window is a message interaction window that is in the first interface and that is indicated by a first label.

2. The method according to claim 1, wherein the first interface is a user interface of a first application, and the unread message management window is a window of the first application; and
   before the receiving a first input performed by a user, the method further comprises:
   receiving a first message, wherein the first message is a message received via the first application; and
   adding the first message into the unread message management window.

3. The method according to claim 2, wherein the adding the first message into the unread message management window comprises:
   in a case that a first contact is not a target contact, adding the first message into each of a first message interaction window and the unread message management window, wherein the first contact is a contact that sends the first message, the first message interaction window is a window that is of the first application and that is used for the user to perform message interaction with the first contact, and a message sent by the target contact is prohibited from being added into the unread message management window.

4. The method according to claim 3, wherein the method further comprises:
   in a case that the first contact is the target contact, adding the first message into the first message interaction window, and prohibiting the first message from being added into the unread message management window.

5. The method according to claim 1, wherein after the displaying an unread message management window, the method further comprises:
   receiving a third input performed by the user, wherein the third input is an input performed for a first display area, the first display area is one of the at least one display area, and an unread message in the first display area is a message sent by a second contact; and
   performing a target action in response to the third input, wherein the target action is either of displaying a second message interaction window or displaying an input control in the unread message management window, the second message interaction window is a window for the user to perform message interaction with the second contact, and the input control is used for the user to enter content of a message to be sent to the second contact.

6. The method according to claim 5, wherein the third input is an input performed by the user in a first area, the target action is displaying the second message interaction window, and the first area is an area that is in the first display area and that is different from an area where message content is displayed; or the third input is a selection input performed by the user for a first unread message, the target action is displaying the input control in the unread message management window, and the first unread message is displayed in the first display area.

7. A terminal device, comprising a processor, a memory, and a computer program that is stored in the memory and executable on the processor, wherein the computer program, when executed by the processor, causes the terminal device to perform:

receiving a first input performed by a user, wherein the first input is an input performed by the user for a target identifier in a first interface;

displaying an unread message management window in response to the first input, wherein the unread message management window comprises a plurality of unread message groups, and each unread message group comprises at least one unread message;

receiving a fourth input performed by the user, wherein the fourth input is an input performed by the user for a second unread message, and the second unread message is an unread message in an unread message group; and deleting the second unread message from the unread message management window in response to the fourth input, wherein after the second unread message is deleted from the unread message management window, and display is switched from the unread message management window to the first interface, a state of the second unread message in a third message interaction window remains in an unread state, wherein the third message interaction window is a message interaction window that is in the first interface and that is indicated by a first label.

8. The terminal device according to claim 7, wherein the first interface is a user interface of a first application, and the unread message management window is a window of the first application; and the computer program, when executed by the processor, causes the terminal device to further perform:

receiving a first message, wherein the first message is a message received via the first application; and adding the first message into the unread message management window.

9. The terminal device according to claim 8, wherein the computer program, when executed by the processor, causes the terminal device to perform:

in a case that a first contact is not a target contact, adding the first message into each of a first message interaction window and the unread message management window, wherein the first contact is a contact that sends the first message, the first message interaction window is a window that is of the first application and that is used for the user to perform message interaction with the first contact, and a message sent by the target contact is prohibited from being added into the unread message management window.

10. The terminal device according to claim 9, wherein the computer program, when executed by the processor, causes the terminal device to further perform:

in a case that the first contact is the target contact, adding the first message into the first message interaction window, and prohibiting the first message from being added into the unread message management window.

11. The terminal device according to claim 7, wherein the computer program, when executed by the processor, causes the terminal device to further perform:

receiving a third input performed by the user, wherein the third input is an input performed for a first display area, the first display area is one of the at least one display area, and an unread message in the first display area is a message sent by a second contact; and performing a target action in response to the third input, wherein the target action is either of displaying a second message interaction window or displaying an input control in the unread message management window, the second message interaction window is a window for the user to perform message interaction with the second contact, and the input control is used for the user to enter content of a message to be sent to the second contact.

12. The terminal device according to claim 11, wherein the third input is specifically an input performed by the user in a first area, the target action is displaying the second message interaction window, and the first area is an area that is in the first display area and that is different from an area where message content is displayed; or the third input is specifically a selection input performed by the user for a first unread message, the target action is displaying the input control in the unread message management window, and the first unread message is displayed in the first display area.

13. A non-transitory computer-readable storage medium, wherein the non-transitory computer-readable storage medium stores a computer program, and the computer program, when executed by a processor, causes the processor to perform:

receiving a first input performed by a user, wherein the first input is an input performed by the user for a target identifier in a first interface;

displaying an unread message management window in response to the first input, wherein the unread message management window comprises a plurality of unread message groups, and each unread message group comprises at least one unread message;

receiving a fourth input performed by the user, wherein the fourth input is an input performed by the user for a second unread message, and the second unread message is an unread message in an unread message group; and deleting the second unread message from the unread message management window in response to the fourth input, wherein after the second unread message is deleted from the unread message management window, and display is switched from the unread message management window to the first interface, a state of the second unread message in a third message interaction window remains an unread state, wherein the third message interaction window is a message interaction window that is in the first interface and that is indicated by a first label.

14. The non-transitory computer-readable storage medium according to claim 13, wherein the first interface is a user interface of a first application, and the unread message management window is a window of the first application; and the computer program, when executed by the processor, causes the processor to further perform:

receiving a first message, wherein the first message is a message received via the first application; and adding the first message into the unread message management window.

15. The method according to claim 1, wherein a message interaction window indicated by N labels in the first interface comprises M unread messages, and both N and M are positive integers; and after the displaying an unread message management window, the method further comprises:

receiving a second input performed by the user; and displaying the first interface in response to the second input, wherein after display is switched from the unread message management window to the first interface, all messages in a message interaction window indicated by K labels are in a read state, the K labels are labels of the N labels, the message in the message interaction window indicated by the K labels is a message that is of the M unread messages and that is in an area visible to the user when the unread message management window is displayed, and K is a positive integer less than or equal to N.

16. The terminal device according to claim 7, wherein a message interaction window indicated by N labels in the first interface comprises M unread messages, and both N and M are positive integers; and the computer program, when executed by the processor, causes the terminal device to further perform:

receiving a second input performed by the user; and displaying the first interface in response to the second input, wherein after display is switched from the unread message management window to the first interface, all messages in a message interaction window indicated by K labels are in a read state, the K labels are labels of the N labels, the message in the message interaction window indicated by the K labels is a message that is of the M unread messages and that is in an area visible to the user when the unread message management window is displayed, and K is a positive integer less than or equal to N.

17. The non-transitory computer-readable storage medium according to claim 13, wherein the computer program, when executed by the processor, causes the processor to further perform:

receiving a third input performed by the user, wherein the third input is an input performed for a first display area, the first display area is one of the at least one display area, and an unread message in the first display area is a message sent by a second contact; and performing a target action in response to the third input, wherein the target action is either of displaying a second message interaction window or displaying an input control in the unread message management window, the second message interaction window is a window for the user to perform message interaction with the second contact, and the input control is used for the user to enter content of a message to be sent to the second contact.

18. The method according to claim 1, wherein the unread message management window comprises at least one display area, and each display area displays at least one unread message in an unread message group; and all unread messages in each display area are sent by a same contact; or all unread messages in each display area have a same characteristic, and a characteristic of each message is determined based on at least one of: a keyword of the message, semantic information of the message, or format information of the message.

19. The terminal device according to claim 7, wherein the unread message management window comprises at least one display area, and each display area displays at least one unread message in an unread message group; and all unread messages in each display area are sent by a same contact; or all unread messages in each display area have a same characteristic, and a characteristic of each message is determined based on at least one of: a keyword of the message, semantic information of the message, or format information of the message.

* * * * *